United States Patent
Faccin et al.

(10) Patent No.: US 9,215,684 B2
(45) Date of Patent: Dec. 15, 2015

(54) METHODS AND APPARATUS TO MAINTAIN CALL CONTINUITY

(71) Applicant: BlackBerry Limited, Waterloo (CA)

(72) Inventors: Stefano Faccin, Hayward, CA (US); Richard Charles Burbidge, Hook (GB); Jan Hendrik Lucas Bakker, Keller, TX (US); Chen Ho Chin, Deerlijk (MY)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/172,248

(22) Filed: Feb. 4, 2014

(65) Prior Publication Data

US 2014/0146685 A1    May 29, 2014

Related U.S. Application Data

(63) Continuation of application No. 13/212,775, filed on Aug. 18, 2011, now Pat. No. 8,665,828.

(60) Provisional application No. 61/374,869, filed on Aug. 18, 2010.

(51) Int. Cl.
| | |
|---|---|
| *H04W 4/00* | (2009.01) |
| *H04W 60/06* | (2009.01) |
| *H04W 60/00* | (2009.01) |
| *H04W 24/08* | (2009.01) |
| *H04W 36/00* | (2009.01) |

(52) U.S. Cl.
CPC .............. *H04W 60/06* (2013.01); *H04W 24/08* (2013.01); *H04W 60/00* (2013.01); *H04W 36/0022* (2013.01)

(58) Field of Classification Search
USPC ............ 370/331, 338, 395.2; 455/432.1, 434, 455/435.1, 435.2, 436, 437, 438, 439, 442, 455/450, 456.1, 456.2
See application file for complete search history.

(56) References Cited

U.S. PATENT DOCUMENTS

| | | | |
|---|---|---|---|
| 7,058,403 B2 | 6/2006 | Zhao et al. | |
| 7,983,228 B1 | 7/2011 | Choksi | |
| 8,018,909 B2 | 9/2011 | Ahlen et al. | |
| 2002/0062379 A1 | 5/2002 | Widegren et al. | |

(Continued)

FOREIGN PATENT DOCUMENTS

WO          2012024486          2/2013

OTHER PUBLICATIONS

Patent Cooperation Treaty, "International Search Report," issued in connection with PCT/US2011/048248, on Jan. 31, 2012 (6 pages).

(Continued)

*Primary Examiner* — Alvin Zhu
(74) *Attorney, Agent, or Firm* — Fish & Richardson P.C.

(57) ABSTRACT

Example methods and apparatus to maintain call continuity are disclosed. A disclosed example apparatus to control a user equipment (UE) mode includes the UE to initiate a tracking area updating (TAU) procedure in an evolved packet system (EPS) mobility management (EMM) connected (EMM_CONNECTED) mode, a state monitor to identify a lack of a voice service in response to the TAU procedure being successful, and a bearer monitor to identify a bearer context, the UE to stay in the EMM_CONNECTED mode until radio bearers associated with the bearer context are released.

28 Claims, 16 Drawing Sheets

(56) References Cited

U.S. PATENT DOCUMENTS

| | | | |
|---|---|---|---|
| 2006/0250994 | A1 | 11/2006 | Sasaki et al. |
| 2009/0270099 | A1 | 10/2009 | Gallagher et al. |
| 2010/0081444 | A1* | 4/2010 | Jin et al. .................... 455/450 |
| 2010/0157872 | A1 | 6/2010 | Hyun et al. |
| 2010/0227621 | A1 | 9/2010 | Wu |
| 2010/0297979 | A1* | 11/2010 | Watfa et al. ............... 455/404.1 |
| 2011/0002327 | A1 | 1/2011 | Dwyer et al. |
| 2011/0167182 | A1 | 7/2011 | Palin et al. |
| 2012/0034898 | A1 | 2/2012 | Tiwari |
| 2012/0044867 | A1 | 2/2012 | Faccin et al. |
| 2012/0044868 | A1 | 2/2012 | Faccin et al. |
| 2012/0163601 | A1 | 6/2012 | Veron et al. |

OTHER PUBLICATIONS

Patent Cooperation Treaty "Written Opinion of the International Searching Authority," issued in connection with International Patent Application No. PCT/US2011/048248, on Jan. 31, 2012 (17 pages).

Patent Cooperation Treaty "International Preliminary Report on Patentability," issued in connection with International Patent Application No. PCT/US2011/048248, on Feb. 19, 2013 (16 pages).

United States Patent and Trademark Office, "Non-Final Office Action," issued in connection with U.S. Appl. No. 13/212,775, on Apr. 25, 2013 (18 pages).

United States Patent and Trademark Office, "Notice of Allowance," issued in connection with U.S. Appl. No. 13/212,775, on Oct. 21, 2013 (7 pages).

United States Patent and Trademark Office, "Non-Final Office Action," issued in connection with U.S. Appl. No. 13/212,784, on Jan. 6, 2014 (14 pages).

United States Patent and Trademark Office, "Final Rejection," issued in connection with U.S. Appl. No. 13/212,784, on Apr. 24, 2014 (8 pages).

European Patent Office, "Communication Pursuant to Rules 161(1) and 162 EPC," issued in connection with European Patent Application No. 11754952.7, on Apr. 2, 2013 (2 pages).

"3rd Generation Partnership Project; Technical Specification Group Core Network and Terminals; Non-Access-Stratum (NAS) protocol for Evolved Packet System (EPS); Stage 3 (Release 9)," 3GPP TS 24.301 V9.2.0, Mar. 2010 (292 pages).

"3rd Generation Partnership Project; Technical Specification Group Services and System Aspects; General Packet Radio Service (GPRS) enhancements for Evolved Universal Terrestrial Radio Access Network (E-UTRAN) access (Release 9)," 3GPP TS 23.401 V9.5.0, Jun. 2010 (259 pages).

Research in Motion, "Keeping the real-time multi-media session if resources are available—24.301," Change Request, 3GPP TSG-CT WG1 Meeting #67, C1-103826, Barcelona, Spain, Oct. 11-15, 2010 (13 pages).

"Digital cellular telecommunications system (Phase 2+); Universal Mobile Telecommunications System (UMTS); LTE; Mobile radio interface Layer 3 specification; Core network protocols; Stage 3 (3GPP TS 24.008 version 9.3.0 Release 9)," ETSI TS 124 008 V9.3.0, Jul. 2010 (611 pages).

"3rd Generation Partnership Project; Technical Specification Group Core Network and Terminals; Policy and Charging Control over Rx reference point (Release 9)," 3GPP TS 29.214 V9.3.0, Mar. 2010 (45 pages).

"3rd Generation Partnership Project; Technical Specification Group Services and System Aspects; Policy and Charging Control Architecture (Release 10)," 3GPP TS 23.203 V10.0.0, Jun. 2010 (126 pages).

Lindstrom et al., "Using the Policy Control System as an Auxiliary Tool to Improve the Service Assurance Process in Telecommunications Networks," Globecome Workshops, IEEE, Nov. 1, 2007 (5 pages).

Wikipedia. E-UTRA, www.wikipedia.org, internet page last modified on Jul. 25, 2010 (10 pages).

Acme Packet, Acme packet defines role of its Net-Net product family within IMS LTE networks, www.acmepacket.com, Aug. 4, 2010 (3 pages).

Wikipedia, IP Multimedia Subsystem, www.wikipedia.org, internet page last modified on Jul. 30, 2010 (13 pages).

IP Unity, IP Multimedia Subsystem-IMS Technical White Paper, 2005 (26 pages).

The IMS Jungle, P-CSCF: An introduction, www.theimsjungle. wordpress.com, Apr. 30, 2008 (5 pages).

Calhoun et al., "Diameter Network Access Server Application," Network Working Group, RFC 4005, Aug. 2005 (85 pages).

Johnston et al., "Session Description Protocol (SDP) Offer/Answer Examples," Network Working Group, RFC 4317, Dec. 2005 (24 pages).

Wikipedia, Transcoding, www.wikipedia.org, page last modified on Aug. 6, 2010 (3 pages).

"Digital cellular telecommunications system (Phase 2+); Universal Mobile Telecommunications System (UMTS); LTE; Policy and charging control architecture (3GPP TS 23.203 version 9.5.0 Release 9)," ETSI TS 123 203 V9.5.0, Jun. 2010 (126 pages).

"LTE; General Packet Radio Service (GPRS) enhancements for Evolved Universal Terrestrial Radio Access Network (E-UTRAN) access (3GPP TS 23.401 version 9.5.0 Release 9)," ETSI TS 123 401 V9.5.0, Jun. 2010 (261 pages).

"Digital cellular telecommunications system (Phase 2+); Universal Mobile Telecommunications System (UMTS); LTE; IP multimedia call control protocol based on Session Initiation Protocol (SIP) and Session Description Protocol (SDP); Stage 3 (3GPP TS 24.229 version 9.4.0 Release 9)," ETSI TS 124 229 V9.4.0, Jul. 2010 (669 pages).

"Universal Mobile Telecommunications System (UMTS); LTE; Non-Access-Stratum (NAS) protocol for Evolved Packet System (EPS); Stage 3 (3GPP TS 24.301 version 9.3.0 Release 9)," ETSI TS 124 301 V9.3.0, Jun. 2010 (282 pages).

"Universal Mobile Telecommunications System (UMTS); LTE; Policy and charging control over Rx reference point (3GPP TS 29.214 version 9.3.0 Release 9)," ETSI TS 129 214 V9.3.0, Apr. 2010 (48 pages).

Wikipedia, UMTS Terrestrial Radio Access Network, internet page last modified on Jul. 10, 2010 (1 page).

UMTS, UTRAN Protocol Model, www.umtsworld.com, retrieved from the internet on Aug. 2, 2010 (3 pages).

Suyash Tripathi et al., LTE E-UTRAN and its Access Side Protocols, Continuous Computing, downloaded on Aug. 2, 2010 (22 pages).

3GPP TSG-CT WG1, "Keeping the Real-Time Multi-Media Session if Resources are Available," C1-103826, Change Request, 24.301 CR 0911, current version 10.0.0, Meeting #67, Barcelona Spain, Oct. 11-15, 2010, 8 pages.

"Universal Mobile Telecommunications System (UMTS); LTE; Non-Access-Stratum (NAS) protocol for Evolved Packet System (EPS); Stage 3 (3GPP TS 24.301 version 9.2.0 Release 9)," ETSI TS 124 301 V9.2.0, Apr. 2010 (279 pages).

Canadian Intellectual Property Office, "Examiner's Report," issued in connection with corresponding Canadian Patent Application No. 2,808,460, mailed Aug. 25, 2014 (2 pages).

* cited by examiner

METHODS AND APPARATUS TO MAINTAIN CALL CONTINUITY

CROSS REFERENCE TO RELATED APPLICATION

This patent is a continuation of and claims the benefit of U.S. Non-Provisional application Ser. No. 13/212,775, filed on Aug. 18, 2011, and issued as U.S. Pat. No. 8,665,828 on Mar. 4, 2014, which claims the benefit of U.S. Provisional Application No. 61/374,869, filed Aug. 18, 2010 the entire contents of which are hereby expressly incorporated by reference herein in their entireties.

FIELD OF THE DISCLOSURE

The present disclosure relates generally to network communications and, more particularly, to methods and apparatus to maintain call continuity.

BACKGROUND

User equipment (UE), such as mobile devices (e.g., mobile station(s) (MSs)), facilitates communication and/or other data services over one or more networks. The UEs communicate with radio access network(s) (RANs), including any number of base stations. Services provided by some RANs may differ from services provided by other RANs, which may change based on one or more locations of the UEs.

In some circumstances, a RAN may receive service requests from UEs previously serviced by one or more other RANs, such as other RANs separated by adjacent base stations that were supporting a user in an adjacent geographical location. Typically, a UE is serviced by a base station having a corresponding target area (TA) or routing area (RA), depending on a network type (e.g., a 3GPP standards based network, such as, but not limited to universal mobile telecommunications system (UMTS), global system for mobile communications (GSM), general packet radio service (GPRS), universal terrestrial radio access network (UTRAN), enhanced UTRAN (E-UTRAN), or GSM radio access network (GERAN)).

DETAILED DESCRIPTION

Figure 1:
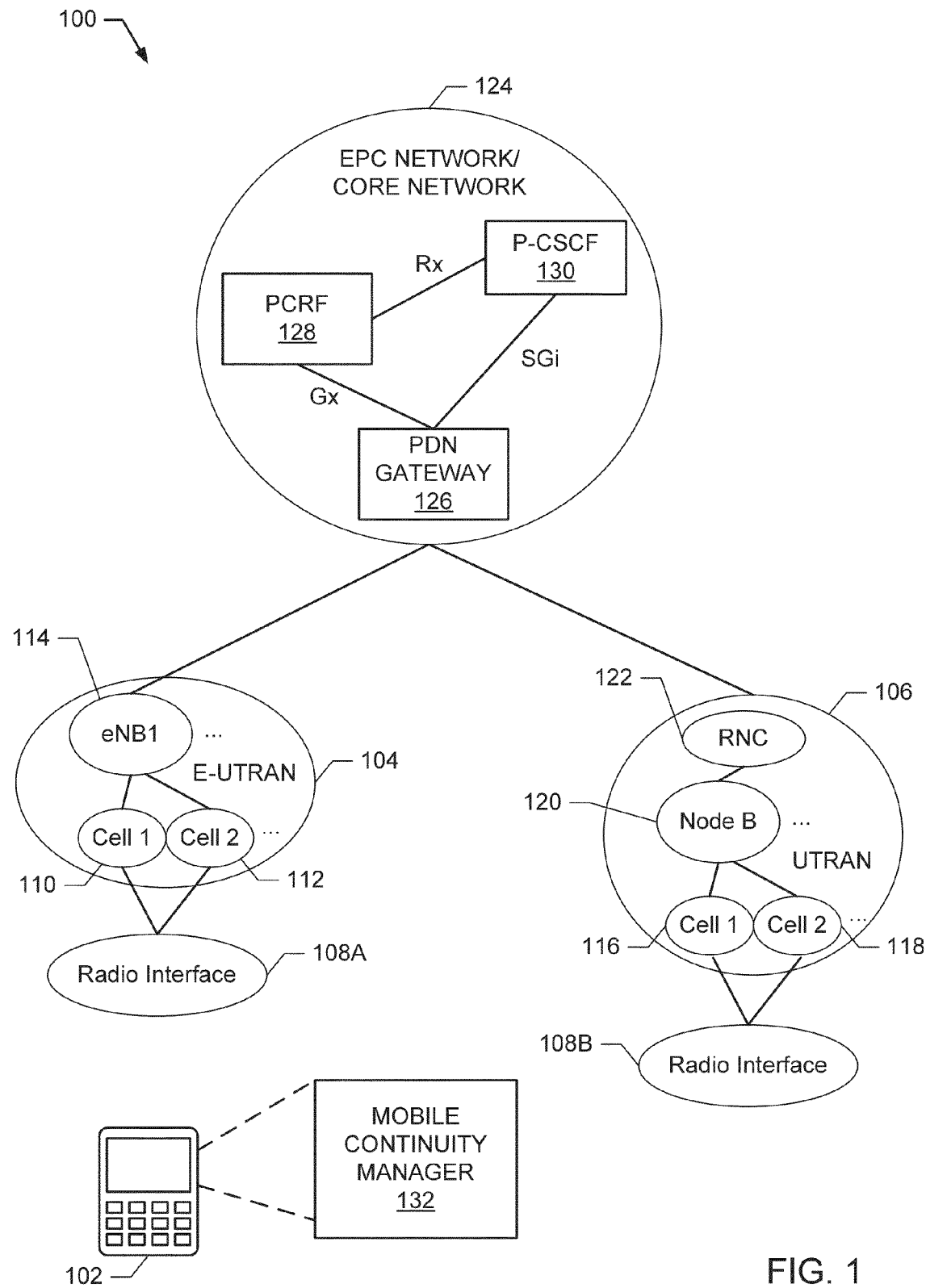
FIG. 1 depicts example mobile communication networks that can receive one or more connection requests from user equipment.

Although the following discloses example methods and apparatus including, among other components, software executed on hardware, it should be noted that such methods and apparatus are merely illustrative and should not be considered as limiting. For example, any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only ways to implement such methods and apparatus.

An example method in a user equipment (UE) having a bearer wherein the bearer has a traffic characteristic includes receiving a message with at least one cause code value, detecting release of the bearer having the traffic characteristic, and performing an action based on the at least one cause code value.

The example methods and apparatus described herein can be used to prevent a UE from dropping a call in response to a change of one or more media indicators, such as voice service indicators (VSIs), indicators related to multimedia (e.g., video, audio, both, etc.), and/or circuit switched (CS) media indicators. As used herein, VSIs may include, but are not limited to indicators related to voice, video, audio and/or combinations thereof. Additionally, as used herein, VSIs may include one or more flags/indicators provided by a serving general packet radio service (GPRS) support node (SGSN) or mobility management entity (MME), such as an Internet Protocol multimedia subsystem (IMS) voice over packet switched (VoPS) session flag/indicator described in further detail below. In some examples, VSIs are not limited to voice, but may include one or more other forms of media (e.g., video). The IMS VoPS may be provided by the SGSN and/or MME to the UE in non-access stratum (NAS) signaling when performing an attach, a routing area update (RAU) or when performing a tracking area update (TAU). In other examples, VSIs may include one or more UE voice settings provided by an operator (e.g., "CS Voice only," "CS Voice preferred, IMS PS Voice as secondary," "IMS PS Voice preferred, CS Voice as secondary," "IMS PS Voice only," etc.) in E-UTRAN and UTRAN in a manner consistent with stage 3 specifications (e.g., a management object defined in 3GPP TS 24.216 and/or 3GPP TS 24.167, the entire disclosure of each is incorporated by reference herein in its entirety). In still other examples, VSIs may include UE usage settings, such as "Voice centric" or "data centric." Still further examples may adjust the VSIs based on one or more results of an attach procedure, a registration update procedure, a combined attach procedure, or a combined registration update procedure.

In some circumstances, VSIs change due to mobility or non-mobility factors that cause the UE to drop an on-going session (e.g., detecting the change of IMSVoPS setting(s)). For example, a UE with an ongoing voice or multimedia session initiated in an area that supports IMS VoPS may move and/or be handed over to an alternate/adjacent area where the IMS VoPS indication indicates "not supported." Although the UE may be fully capable of continuing its current IMS VoPS session while in a new area having a VSI indicative of not supporting IMS VoPS session(s), the UE drops the call (e.g., when the call is in an ongoing voice and/or multimedia session(s), when the UE moves from a Tracking Area (TA) to a Routing Area (RA) where the VSIs are different from the VSIs in the TA). In other words, if the UE is participating in a realtime multimedia session (e.g., a conversational call), then that conversational session is dropped even if, upon completing a handover from one cell to another cell, the network has maintained the necessary packet switched (PS) bearers suitable to maintain the conversation or realtime session.

In other circumstances, VSIs may change for reasons independent of mobility (e.g., independent of the UE moving from a TA to an RA, or vice versa). For example, while the UE is participating in an ongoing session associated with bearer(s) suitable for voice (e.g., radio bearers, EPS bearers, etc.), the VSI value(s) may change from "IMS only" to "CS (circuit switched) only" (or "CS Voice only"). In other examples, the VSI value(s) may change from "IMS only" to CS Voice preferred, IMS PS Voice as secondary." In still other examples, the VSI value(s) may change from "IMS PS Voice preferred, CS Voice as secondary" to "CS only." The above VSI value(s) are merely examples and not an exhaustive list of possible VSI values. However, in such cases in which the VSI value(s) change, such changes cause a status change in the UE causing the UE to release an ongoing bearer that can otherwise continue to support a current session. In other words, current (at the time of the filing date of the instant disclosure) 3GPP standards instruct the UE to drop the session by releasing the current bearer(s). If the UE is in a packet switched voice call, then this will lead to that voice call being dropped.

In still other circumstances, the UE receives a partial registration update with a reject cause of a particular type. As used herein, a partial registration update may include, but is not limited to network procedures in E-UTRAN environments, UTRAN environments, or GERAN environments. Examples of the network procedures for E-UTRAN include a network initiated detach procedure completion by the UE in a manner consistent with 3GPP TS 24.301 (e.g., when returning cause #11 "PLMN Not Allowed," when returning cause #12 "TA Not Allowed," when returning cause #13 "Roaming Not Allowed in this TA," when returning cause #15 "No suitable cells in Tracking Area," when returning cause #25 "Not Authorized for this CSG," etc.), the entire disclosure of which is incorporated by reference herein in its entirety. Examples of the network procedures for E-UTRAN may also include normal and/or periodic TAU procedures in a manner consistent with 3GPP TS 24.301 (e.g., causes #11, #12, #13, #14, #15, #25, etc.). Network procedures for E-UTRAN may also include combined tracking area updating successful for EPS services in a manner consistent with 3GPP TS 24.301 (e.g., when returning cause #22 "Congestion," when returning cause #18 "CS Domain Not Available," etc.). Additionally, network procedures for E-UTRAN may also include combined tracking area procedure not accepted by the network in a manner consistent with 3GPP TS 24.301 (e.g., when returning cause #11, #12, #13, #14, #15, #25, etc.). Still further, network procedures for E-UTRAN may include service request procedure not accepted by the network in a manner consistent with 3GPP TS 24.301 (e.g., when returning cause #11, #12, #13, #15, #25, etc.).

Examples of the network procedures for GERAN or UTRAN include network initiated GPRS detach procedure completion by the MS in a manner consistent with 3GPP TS 24.008 (e.g., when returning cause #11, #12, #13, #15, #25, etc.), the entire disclosure of which is incorporated by reference herein in its entirety. Additionally, examples of the network procedures for GERAN or UTRAN include normal and periodic routing area updating procedure not accepted by the network in a manner consistent with 3GPP TS 24.008 (e.g., when returning cause #11, #12, #13, #15, #25, etc.). Still further, examples of the network procedures for GERAN or UTRAN include service request procedure not accepted by the network in a manner consistent with 3GPP TS 24.008 (e.g., when returning cause #11, #12, #13, #15, #25, etc.).

When the UE is in an ongoing voice or multi-media session, such as in an evolved packet system (EPS) environment, EPS mobility management (EMM) may perform one or more procedures in response to, for example, the UE being handed over to or entering a new TA in which the EMM is aware of no registration information existing for either the mobile or the network, and/or having registration information that is different from the TA in which the UE was connected or located prior to being handed over to the new TA. Current 3GPP procedures (at the time of filing of the instant disclosure) instruct the UE to release EPS bearers for one or more instances of partial registration even when the UE has been provided bearers that are suitable for continuing the voice or multimedia session. Such procedural action results in unnecessary session interruption and corresponding user dissatisfaction.

In still other circumstances, the UE receives a registration update accept (e.g., OK, accept) with a result indication of a particular type (e.g. "SMS only," "CSFB not preferred," "tracking area update success for EPS services only," etc.). Such result type indication changes the VSI. Current 3GPP procedures (at the time of filing of the instant disclosure) considering such a change of the VSI instructs the UE to release EPS bearers for one or more instances of registration accept even when the UE has bearers that are suitable for providing continued service to the UE. Such procedural action results in unnecessary session interruption and corresponding user dissatisfaction.

The methods and apparatus described herein also address circumstances in which changes in a codec occur due to, for example, a circuit switched network. If the codec change is not propagated from a source UE to a destination UE, voice service experience degradation may occur (e.g., due to transcoding or voice call quality degradation). In the event of an active voice session in which a codec changes, a new/alternate codec may be determined and/or negotiated and minimize call quality degradation if the codec is allowed to change. In general, if voice is transmitted using a bearer and the session information supported by the bearer needs to change (e.g., due to maintaining a transcoding-free voice service experience), new session information (e.g., where session information or service information can be derived from Session Description Protocol (SDP) payload included in Session Initiation Protocol (SIP) requests and SIP responses) needs to be authorized by network components. However, a network component authorizing service information or session information may take into account VSI when an initial SIP INVITE request (e.g. an initial request for a (new) dialog) to create a related request (with SDP payload) or corresponding response (with SDP payload) is received at a SIP enabled network node. SIP requests modifying or updating an existing dialog cannot be distinguished at the network node. Thus, a network node taking into account VSI when authorizing service information or session information may not come to the same conclusion or disposition when requested to authorize session information for a new session or when requested to authorize session information for an existing session. In other words, a different response, subject to VSI, to a request for authorizing session information that provides for session information changes (e.g., codec changes) when a current session is ongoing is desired. For an existing session, even if the VSI indicates no PS voice services, the request for authorizing session information that provides for session information changes (e.g., codec changes) should not be rejected. Additionally, any request for a modification of the current session should not be rejected in view of current VSI values.

Turning to FIG. 1, an example network 100 includes an example UE 102 communicatively connected to an E-UTRAN 104 or a UTRAN 106 via a radio interface 108A, 108B. The E-UTRAN 104 includes an example first cell 110, an example second cell 112 and an example enhanced Node B 114. Without limitation, the E-UTRAN 104 may include any number of cells and/or enhanced Node Bs, which control the cells to provide radio coverage over an area. The UTRAN 106 includes an example first cell 116, an example second cell 118, an example Node B 120 and an example radio network controller (RNC) 122. Without limitation, the UTRAN 106 may include any number of cells, Node Bs and/or RNCs. The E-UTRAN 104 and the UTRAN 106 are communicatively connected to an example EPC network 124 and/or other core network(s).

The EPC network 124 includes an example PDN gateway 126 to provide connectivity from the UE 102 (or any number of UEs) via the E-UTRAN 104 and/or the UTRAN 106 to external packet data networks. In operation, the PDN gateway 126 performs policy enforcement, packet filtering, charging support, packet screening, etc., and includes a Gx reference point to enable a PCRF to have dynamic control over policy and charging control (PCC) system behavior at a Policy and Charging Enforcement Function (PCEF) in a manner pursuant to 3GPP TS 23.203, the entire disclosure of which is incorporated by reference herein in its entirety. The EPC network 124 also includes a policy and charging rules function (PCRF) 128 and a proxy call session control function (P-CSCF) 130 as part of the PCC system. In the illustrated example of FIG. 1, an Rx reference point resides between the P-CSCF 130 and the PCRF 128, in which the Rx reference point may enable transport of application level session information from an application function (AF) (e.g., the P-CSCF 130) to PCRF 128 in a manner pursuant to 3GPP TS 23.203. Additionally, an SGi reference point is between the PDN gateway 126 and the P-CSCF in a manner pursuant to 3GPP TS 23.401, the entire disclosure of which is incorporated by reference herein in its entirety.

The UE 102 includes a mobile continuity manager 132 to facilitate, in part, methods and apparatus to maintain call continuity caused by VSI values changing due to mobility factors (e.g., UE moving from a TA to an RA), non-mobility factors (e.g., operator adjustment of voice settings, user adjustment of voice settings), circumstances involving partial registration update(s), circumstances involving detach request(s) and/or circumstances involving successful registration update(s). In other words, in the event that VSI values, a new TA/RA, partial registration update(s), detach request(s), and/or the registration update accept with a result indication of a particular type dictate that a current session is not allowed, the methods and apparatus described herein postpone the release of the session until after the bearers are released normally, abnormally or otherwise subsequently. As described in further detail below, current specifications (at the time of filing of the instant disclosure) dictate that ongoing session(s), including multimedia and/or conversational session(s), must be dropped in response to VSI changes indicative of non-support for a current service, even if radio resources are provided or maintained during a handoff and after a successful handover.

Figure 2:
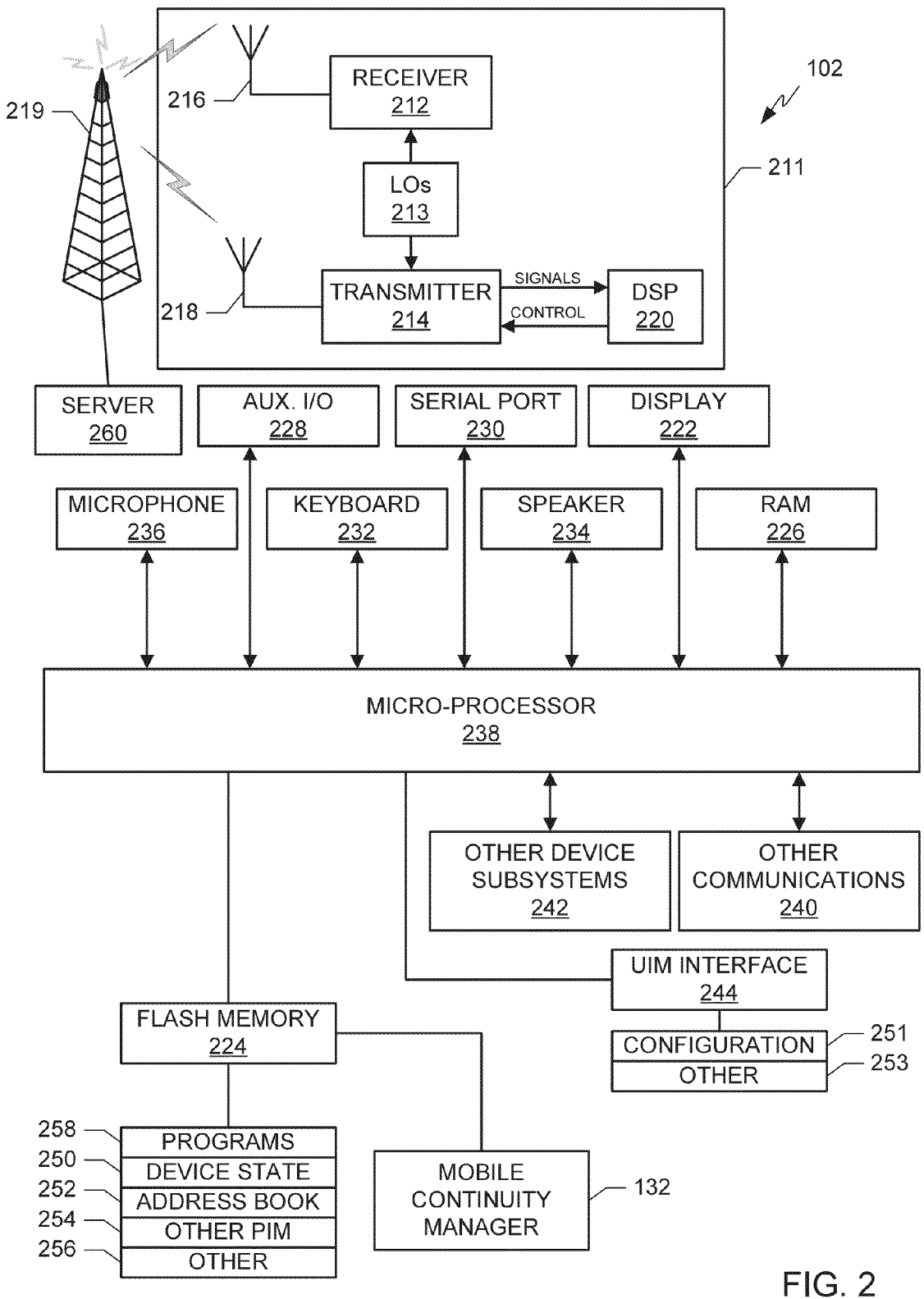
FIG. 2 depicts an example user equipment that can be implemented in accordance with this disclosure.

FIG. 2 is an example of the UE 102 of FIG. 1 that can be implemented in accordance with this disclosure. The UE 102, within which the mobile continuity manager 132 operates, is preferably a two-way wireless communication device having at least voice and data communication capabilities. UE 102 preferably has the capability to communicate with other computer systems on a network, an intranet, and/or the Internet. Depending on the exact functionality provided, the wireless device (e.g., the UE 102) implemented as a single unit such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the wireless device (e.g., the UE 102) may be a multiple-module unit comprising a plurality of separate components, including but not limited to a computer or other device connected to a wireless modem.

Where UE 102 is enabled for two-way communication, it will incorporate a communication subsystem 211, including both a receiver 212 and a transmitter 214, as well as associated components such as one or more, preferably embedded or internal, antenna elements 216 and 218, local oscillators (LOs) 213, and a processing module such as a digital signal processor (DSP) 220. The particular design of the communication subsystem 211 will be dependent upon the communication network in which the device is intended to operate. For example, UE 102 may include a communication subsystem 211 designed to operate within a 2G network, a 3G network, a fourth generation (4G) network, the GPRS network, a universal mobile telecommunications system (UMTS) network, a long term evolution (LTE) network, a code division multiple access (CDMA) network, etc.

Network access requirements will also vary depending upon the type of network 219. For example, in UMTS, GPRS and/or LTE networks, network access is associated with a subscriber or user of the UE 102. For example, a GPRS mobile device therefore requires a subscriber identity module (SIM) card in order to operate on a GPRS network. In UMTS a universal subscriber identity module (USIM) or SIM module is required. However, in CDMA a removable user identity module (RUIM) card or module is required. These will be referred to as a UIM interface herein. Without a valid UIM interface, a mobile device (also referred-to herein as user equipment (UE) or a mobile station (MS)) may not be fully functional. Local or non-network communication functions, as well as legally required functions (if any) such as emergency calling, may be available, but mobile device 102 will be unable to carry out any other functions involving communications over the network. The UIM interface 244 is normally similar to a card-slot into which a card can be inserted and ejected like a diskette or PCMCIA card. The UIM card can have approximately 64K of memory and hold many key configuration 251, and other information 253 such as identification, and subscriber related information.

When required network registration or activation procedures have been completed, UE 102 may send and receive communication signals over the network 219 (e.g., the example E-UTRAN 104 and/or the example EPC network 124 of FIG. 1). Signals received by an antenna 216 through the communication network 219 are input to a receiver 212, which may perform such common receiver functions as signal amplification, frequency down conversion, filtering, channel selection and the like, including analog to digital (A/D) conversion. A/D conversion of a received signal allows more complex communication functions such as demodulation and decoding to be performed in the DSP 220. In a similar manner, signals to be transmitted are processed, including modulation and encoding for example, by DSP 220 and input to transmitter 214 for digital to analog conversion, frequency up conversion, filtering, amplification and transmission over the communication network 219 via the antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network 219 may further communicate with multiple systems, including a server 260. For example, network 219 may communicate with both an enterprise system and a web client system to accommodate one or more clients with one or more service levels.

UE 102 includes a microprocessor 238 which controls the overall operation of the device. Communication functions, including at least data communications, are performed through communication subsystem 211. Microprocessor 238 also interacts with further device subsystems such as the display 222, flash memory 224, random access memory (RAM) 226, auxiliary input/output (I/O) subsystems 228, serial port 230, keyboard 232, speaker 234, microphone 236, a short-range communications subsystem 240 and any other device subsystems generally designated as 242.

Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list.

Operating system software used by the microprocessor 238 may be stored in a persistent store such as flash memory 224, which may instead be a read-only memory (ROM) or similar storage element (not shown). The operating system, specific device applications, or parts thereof, may be temporarily loaded into a volatile memory such as RAM 226. Received communication signals may also be stored in RAM 226. Further, a unique identifier is also preferably stored in read-only memory.

As shown in FIG. 2, flash memory 224 can be segregated into different areas for both computer programs 258 and program data storage 250, 252, 254 and 256. These different storage types indicate that each program can allocate a portion of flash memory 224 for their own data storage requirements. The flash memory 224 additionally includes the mobile continuity manager 132. As described in further detail below, the mobile continuity manager 132 identifies one or more conditions of the UE 102 associated with VSI value changes and corresponding actions to release or maintain conversational sessions that may be ongoing. The mobile continuity manager 132 may operate in a manner consistent with one or more standards such as, but not limited to TS 24.008, TS 24.301, TS 24.229, the entire disclosure of which is incorporated by reference herein in its entirety, and/or TS 29.214, the entire disclosure of which is incorporated by reference herein in its entirety.

Figure 3:
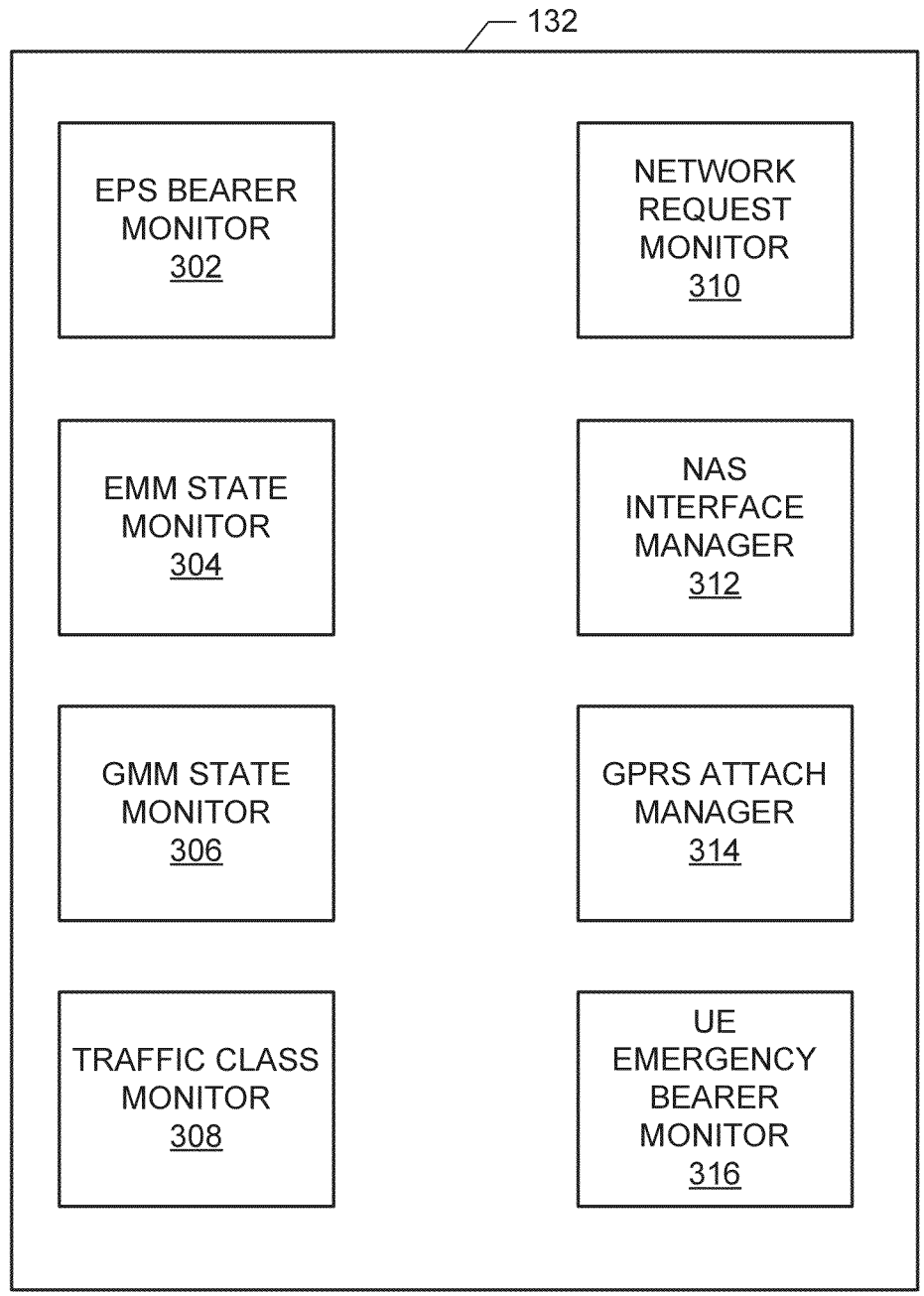
FIG. 3 depicts an example mobile continuity manager that can be implemented in accordance with this disclosure.

FIG. 3 is a block diagram of the example mobile continuity manager 132 shown in FIGS. 1 and 2. The mobile continuity manager 132 of FIG. 3 includes an example EPS bearer monitor 302, an example EMM state monitor 304, an example GMM state monitor 306 and an example traffic class monitor 308. The mobile continuity manager 132 also includes an example network request monitor 310, an example NAS interface manager 312, an example GPRS attach manager 314, and an example UE emergency bearer monitor 316. Operation of the mobile continuity manager 132 of FIG. 3 will be explained in further detail in view of the example flow diagrams of FIGS. 4-16.

The mobile continuity manager 132 of FIG. 3 and flow diagrams of FIGS. 4-16 address one or more issues related to dropping conversational and/or multimedia sessions despite sufficient bearer resources (e.g., radio) being available to maintain the conversational sessions. In some examples, the UE 102 may move from a first place (e.g., a source cell) where IMS voice over packet switched (VoPS) session is supported, or where the VSI value(s) indicate that the VoPS session is supported to a second place (e.g., a target cell) where IMS VoPS session is not supported, or where the VSI value(s) indicate that the VoPS service is not supported. VSI values may provide one or more indications of support for one or more services by way of, for example, an IMS VoPS flag set to a text value, a numeric value and/or an alphanumeric value (e.g., "YES," "NO," etc.). When the UE 102 involved in a conversational session in which one or more PS bearers are suitable for voice services moves to the second area where the IMS VoPS indicator indicates "not supported," the current specifications (at the time of filing of the instant disclosure) require the current conversational or multimedia session (or any other session) be dropped. The conversational session is dropped even if the network 100 has maintained the radio resources (e.g., upon performing a handover between cells) that can support PS bearer(s) suitable for voice or real time services (e.g., upon performing a handover between cells). The UE 102 may have been participating in an ongoing session (e.g., a conversational PS bearer suitable for voice) at a source cell that is associated with VSI values indicative of support for VoIMS, VoPS, etc., when moving between two networks (e.g., E-UTRAN, UTRAN, etc.). Upon entering a target cell, the UE 102 re-evaluates the value(s) of VSIs upon completing a TAU, combined TAU or RAU (depending on the network type), for example, after a handover has occurred. However, current specifications (at the time of filing of the instant disclosure) do not explicitly describe a scenario of transition between TAs and/or RAs where the VSI value(s) change. Additionally, the current specifications do not specify that the UE 102 may perform a voice domain selection while a current voice session is ongoing. Instead, the current specifications permit voice domain selection when completing registration updates (e.g., attach, RAU, TAU, etc.).

In the event that the UE 102 no longer has an indication of supported service when moving to a target area (e.g., an indication that IMS voice is not available), then the current specifications instruct the UE to terminate its established connection to the network and reselect to GERAN/UTRAN. For example, when an operator deploys a service, such as voice over IMS (VoIMS), some areas may be authorized to handle that service, while other areas are restricted from that service. Such restrictions may occur independently of the actual ability of the network to support such services (e.g., business reasons, marketing, restriction on a user's subscription, etc.). When the UE performs an attach, a TAU, a combined TAU, a RAU, then an indication is returned to the UE whether VoIMS, LTE, 3G and/or any other service is supported or can be requested. Then, the UE 102 may perform voice domain selection (e.g., voice centric, data centric, IMS VoPS, etc.). When the UE terminates its established connection, this is accomplished by the UE either releasing its RRC connection or the NAS indicating to the access stratum that the UE 102 needs to operate in idle mode prior to any reselection. While the aforementioned example scenario is generally described in view of an E-UTRAN network, similar issues remain for UTRAN network(s). Accordingly, the user experience with the UE 102 is impacted in a negative manner because the current session is released even in circumstances where the real-time session could be continued due to sufficient radio resources in the target cell (e.g., after the handover). The methods and apparatus described herein address, in part, issues related to unnecessary release of UE bearers (e.g., E-UTRAN VoIP bearers) and refrain from immediate release until the supporting resources or bearers are normally or abnormally released. As used herein, a normal release of one or more bearers occurs when a session is terminated by one or more parties during the conversation (e.g., hanging up the phone at the end of the call, pressing the end button of the UE, etc.). As used herein, an abnormal release of one or more bearers occurs due to one or more error cases or loss of radio connection or coverage.

In other examples, when the methods and apparatus disclosed herein determine, at an application level, that there is an ongoing call or a multimedia session(s), then the VSI may not be checked. In part, this may overcome one or more problems of dropping a session in the event a VSI changes. For example, the UE may initiate a call by way of one or more applications. Applications may include, but are not limited to, phone dialers, voice-to-phone dialers, call over WiFi/SIP applications, etc. The application (e.g., Skype®, GoogleVoice®, etc.) may initiate a call via a man-machine-interface (MMI), which results in one or more assigned bearers. In the event the UE determines, from an application level, that an on-going call exists, the example methods and apparatus disclosed herein refrain from dropping the call.

In other examples, the UE 102 receives partial registration messages having particular reject causes. As used herein, a "partial success" or "partial failure" response from a network occurs when UE registration actions are associated with network generated reject cause values/indicators. For example, the UE 102 may enter a TA that does not have corresponding context information for the newly entered UE 102. Accordingly, the receiving network may respond to the TAU or RAU of the UE 102 with a reject cause value (e.g., #12, #13, #14, #15, #18, #25, etc.). Although the network may allow an existing session (e.g., a multi-media session) to continue (e.g., allow to continue for commercial goodwill) by providing the mobile resources to sustain the ongoing session, the reject cause values in current specifications to dictate that the UE 102 must release its bearers, which are otherwise sufficient to enable the current session to continue. As described in further detail below, the methods and apparatus described herein allows the UE 102 to keep using the provided bearers even when one or more reject cause values from the network (e.g., the EPC/core network 124, E-UTRAN 104, UTRAN 106, etc.) is received.

FIGS. 4-12, 15 and 16 depict flow diagrams representative of example processes that may be implemented using computer readable instructions to monitor for and respond to instances of VSI value changes, detach request message(s), TAU message(s), service message(s) and/or bearer status information to maintain call continuity within the network 100. The example process of FIG. 4, and the example processes of FIGS. 5-12, 15 and 16 described in further detail below, may be performed using a processor, a controller and/or any other suitable processing device. For example, the processes of FIGS. 4-12, 15 and 16 may be implemented using coded instructions (e.g., computer readable instructions) stored on a tangible computer readable medium such as a flash memory, a read-only memory (ROM), and/or a random-access memory (RAM).

Alternatively, the processes of FIGS. 4-12, 15 and 16 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the processes of FIGS. 4-12, 15 and 16 may be implemented manually or as any combination(s) of any of the foregoing techniques, for example, any combination of firmware, software, discrete logic and/or hardware. Further, although the processes of FIGS. 4-12, 15 and 16 are described with reference to the flow diagram of FIGS. 4-12, 15 and 16, other methods of implementing the processes of FIGS. 4-12, 15 and 16 may be employed. For example, the order of execution of the blocks may be changed, and/or some of the blocks described may be changed, eliminated, sub-divided, or combined. Additionally, any or all of the operations of the processes of FIGS. 4-12, 15 and 16 may be performed sequentially and/or in parallel by, for example, separate processing threads, processors, devices, discrete logic, circuits, etc.

Figure 4:
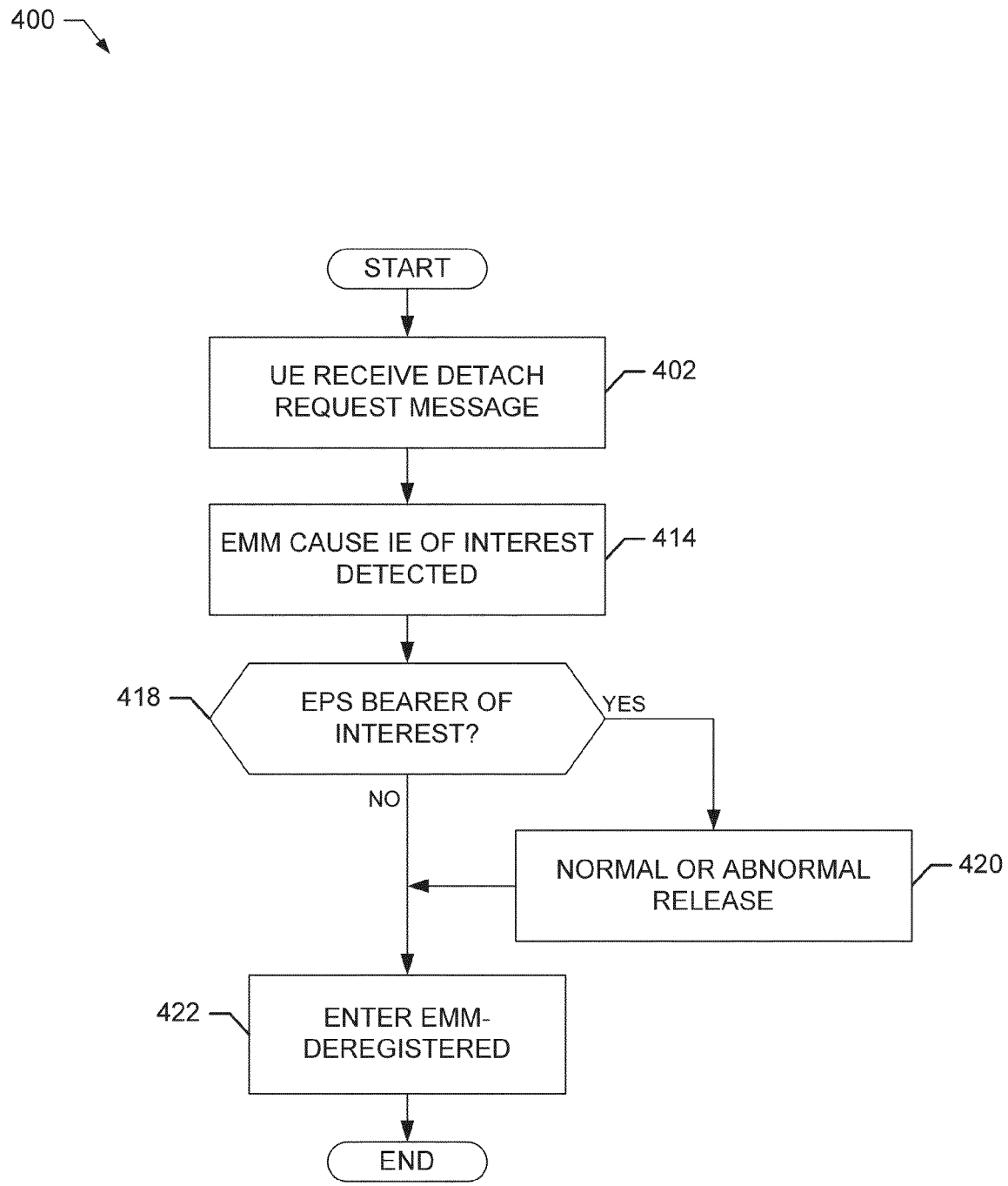
FIGS. 4-12 depict flowcharts of example processes for maintaining call continuity.

In the illustrated example process 400 of FIG. 4, the network request monitor 310 of the mobile continuity manager 132 determines whether the UE 102 receives a detach request message (block 402) (e.g., DETACH REQUEST message). Detach request messages may include a detach type including and/or otherwise indicating "re-attach required," "re-attach not required," or "IMSI detach." If no detach request message is received and/or otherwise identified, the network request monitor 310 continues to wait for receipt of the detach request message. The EMM state monitor 304 determines whether an EMM cause of interest has been received (block 414). If not, control returns to block 402. A cause of interest may include, but is not limited to causes specified in 3GPP TS 24.301 section 5.5.2.3.2. For example, EMM cause #11 indicates that a public land mobile network (PLMN) is not allowed, EMM cause #12 indicates that a tracking area is not allowed, EMM cause #13 indicates that roaming is not allowed in the current tracking area, EMM cause #15 indicates that there are no suitable cells in the tracking area, and EMM cause #25 indicates no authorization for the current closed subscriber group. Although EMM causes #11, 12, 13, 15 and 25 are described above, the methods and apparatus are not limited thereto. For example, additional and/or alternate EMM causes may be employed with the example process 400 of FIG. 4.

In the event an EMM cause of interest is detected (block 414), the EPS bearer monitor 302 determines whether an EPS bearer of interest is detected (block 418). For example, a bearer of interest is detected if the UE 102 has an EPS bearer with a Quality of Service control index (QCI) of "1." As used herein, the QCI is a scalar value used as a reference to a specific packet forwarding behavior (e.g., a packet loss rate, a packet delay budget, etc.) to be provided to a service data flow. The QCI may be implemented, in some examples, in the access network where the QCI references node specific parameters that control packet forwarding treatment (e.g., scheduling weights, admission thresholds, queue management thresholds, link layer protocol configuration, etc.), that have been pre-configured by an operator at a specific node(s) (e.g., eNodeB). QCI characteristics may be standardized in a manner pursuant to 3GPP TS 23.203 in which a QCI value of "1" is associated with "Conversational Voice" having a GBR resource type, a priority value of 2, a packet delay budget of 100 mSeconds and a packet error loss rate of $10^{-2}$. As used herein, QCI values of "1" through "9" are consistent with Table 6.1.7 of 3GPP TS 23.203.

If the UE 102 detects that a bearer of interest, and/or any other bearers, exists, then the UE 102 will refrain from releasing the session and/or any bearers, but will continue to use any bearers of interest until after normal or abnormal bearer release of the bearer(s) of interest has occurred (block 420). If the UE 102 detects that a bearer of interest exists, then the UE 102 maintains the session and continue using at least the bearer of interest until after determining that a normal or abnormal bearer release of the bearer of interest has occurred (block 420).

If there is an abnormal or normal bearer release of at least the bearer of interest (block 420), then the UE 102 releases all the bearers and enters an EMM_DEREGISTERED state (block 422). On the other hand, if there are no EPS bearers of interest detected (e.g., anything other than a specified QCI value "x" or any number of specified QCI values) (block 418), then the UE 102 releases all the bearers and enters the EMM_DEREGISTERED state (block 422).

Figure 5:
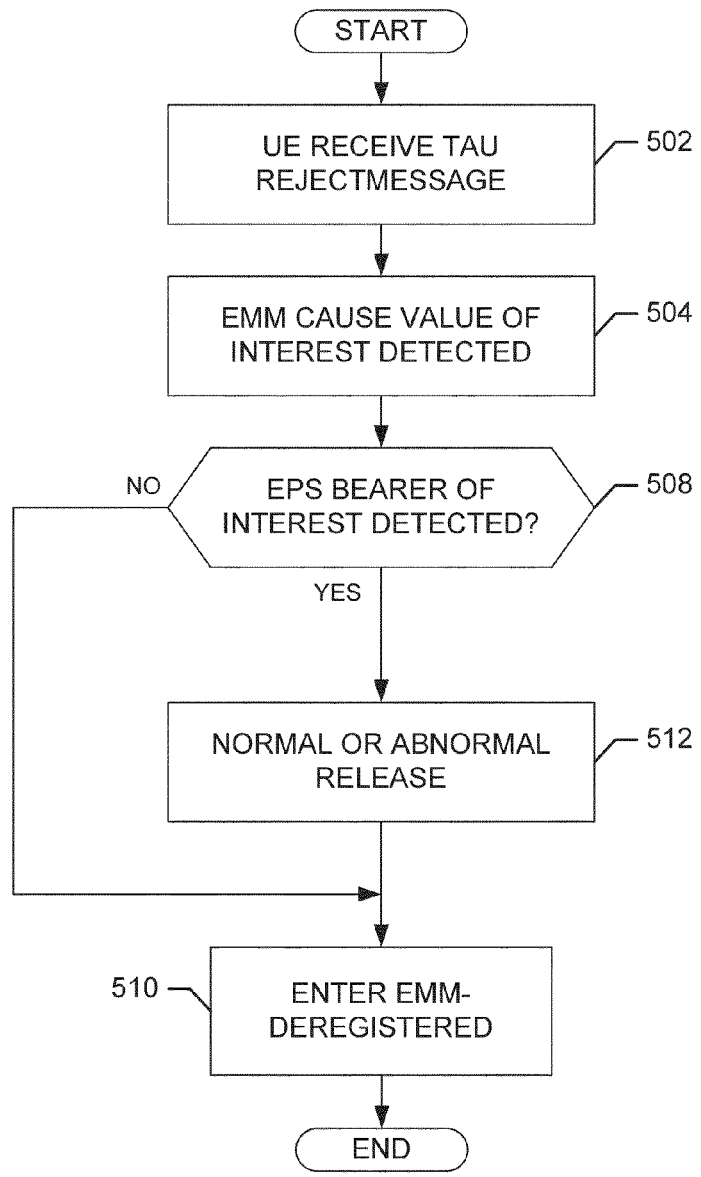

FIG. 5 depicts a flow diagram representative of an example process 500 that may be implemented using computer readable instructions in response to instances where a combined or normal or periodic TAU procedure is not accepted by the network, in a manner generally consistent with 3GPP TS 24.301 section 5.5.3.2.5. In the illustrated example of FIG. 5, the example EMM state monitor 304 determines whether a TAU reject message has been received (block 502). If not, the EMM state monitor 304 continues to monitor for a TAU reject message and, when it is detected, the EMM state monitor 304 determines whether an EMM cause value of interest has been received by the network (block 504). EMM cause values of interest may include, but are not limited to cause #11 indicative of PLMN not allowed, cause #12 indicative of a tracking area not allowed, cause #13 indicative of roaming not allowed in the current tracking area, cause #14 indicative of EPS services not allowed in the current PLMN, cause #15 indicative of no suitable cells in the current tracking area, and/or cause #25 indicative of no authorization for the CSG. Although the aforementioned cause numbers correspond to a cause description, the methods and apparatus described herein are not limited thereto. For example, future revisions of 3GPP TS 24.301 section 5.5.3.2.5 may have alternate and/or additional cause numbers associated with alternate and/or additional cause descriptions.

If no EMM cause value of interest is received (block 504), then control returns to block 502. However, if an EMM cause value of interest is received and/or otherwise detected (block 504), the EPS bearer monitor 302 determines if an EPS bearer of interest (and/or, more generally, any bearer(s)) is detected (block 508), for example, if the UE 102 has an EPS bearer with a Quality of Service control index (QCI) of "1," or for example, bearers of any QCI values or just existence of any bearers. If not, then the UE 102 releases all the bearers and enters a state of EMM_DEREGISTERED (block 510). On the other hand, if the EPS bearer monitor 302 determines that an EPS bearer of interest is detected and/or otherwise received (block 508), then the UE 102 will refrain from releasing the session or any bearers, but continue to use any bearers of interest until after determining that a normal or abnormal bearer release of the bearer(s) of interest has occurred (block 512). If the UE 102 detects a bearer of interest exist, then the UE 102 maintains the session and continues using at least the bearer of interest until after determining that a normal or abnormal bearer release of the bearer of interest has occurred (block 512). Upon an abnormal or normal bearer release, the UE releases all the bearers and enters the state of EMM_DEREGISTERED (block 510).

Figure 6:
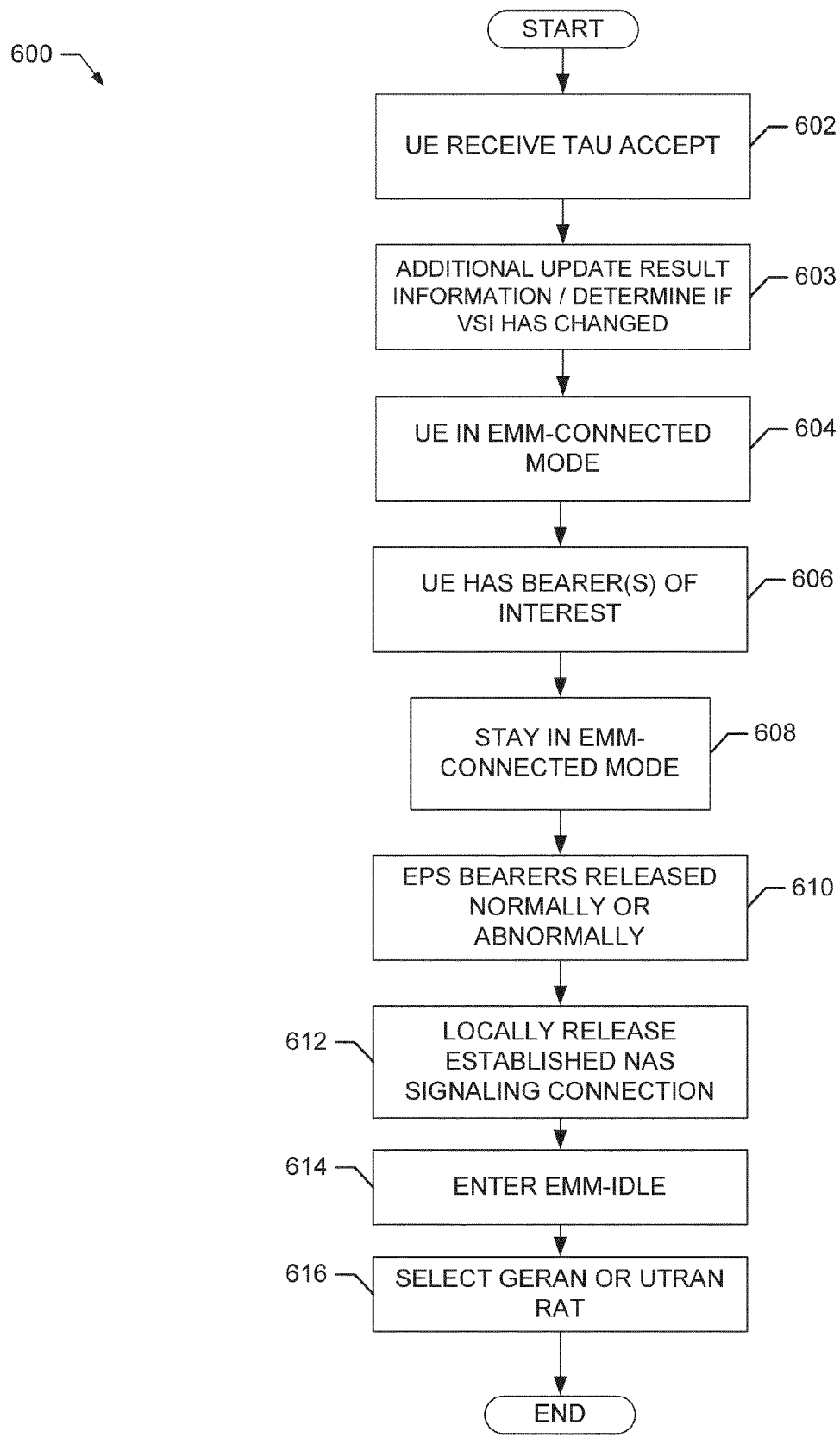

FIG. 6 depicts a flow diagram representative of an example process 600 that may be implemented using computer readable instructions in response to instances where a combined or normal tracking area updating is successful, in a manner generally consistent with 3GPP TS 24.301 section 5.5.3.3.4.2. In the illustrated example of FIG. 6, the EMM state monitor 304 determines whether a TAU accept message has been received (block 602). If not, the EMM state monitor 304 continues to monitor for a TAU accept message and, when it is detected, the EMM state monitor 304 monitors whether the TAU accept message contains an additional update result information element with value "SMS only" or with value "CS Fallback not preferred" and/or that the process of the TAU accept has led to a change of the VSIs (block 603). If the TAU accept message contains an additional update result information element with value "SMS only" or with value "CS Fallback not preferred" or it is determined that VSI has changed (block 603), the EMM state monitor 304 determines whether the UE 102 is in EMM_CONNECTED mode (block 604). If so, the EPS bearer monitor 302 determines if there exist any bearers of interest (block 606), for example, if the UE 102 has an EPS bearer with a Quality of Service control index (QCI) of "1." If so, then the UE 102 stays in the EMM_CONNECTED mode (block 608). If so, the UE 102 will refrain from releasing the session or any bearers, but continue using any bearers (and/or bearers of interest) until after determining that a normal or abnormal bearer release of the bearer(s) of interest has occurred (block 610), thereby allowing any ongoing sessions to continue. If the UE 102 detects a bearer of interest exists, then the UE 102 maintains the session and continues using at least the bearer of interest until after determining that a normal or abnormal bearer release of the bearer of interest has occurred (block 610).

The EPS bearer monitor 302 determines whether at least the bearer of interest is released normally or abnormally (block 610) and, if not, the UE 102 maintains at least the current bearers of interest and stays in EMM_CONNECTED mode (block 608). On the other hand, when at least the bearer of interest is released normally or abnormally (block 610), the NAS interface manager 312 locally releases established NAS signaling connections (block 612), the UE 102 enters the EMM_IDLE state (block 614), and selects a GERAN or UTRAN radio access technology (RAT) (block 616). In the event that the EMM state monitor 304 determines that the UE 102 is not in EMM_CONNECTED mode (block 604), or that there are no bearers of interest (block 606), control advances to block 612.

Figure 7:
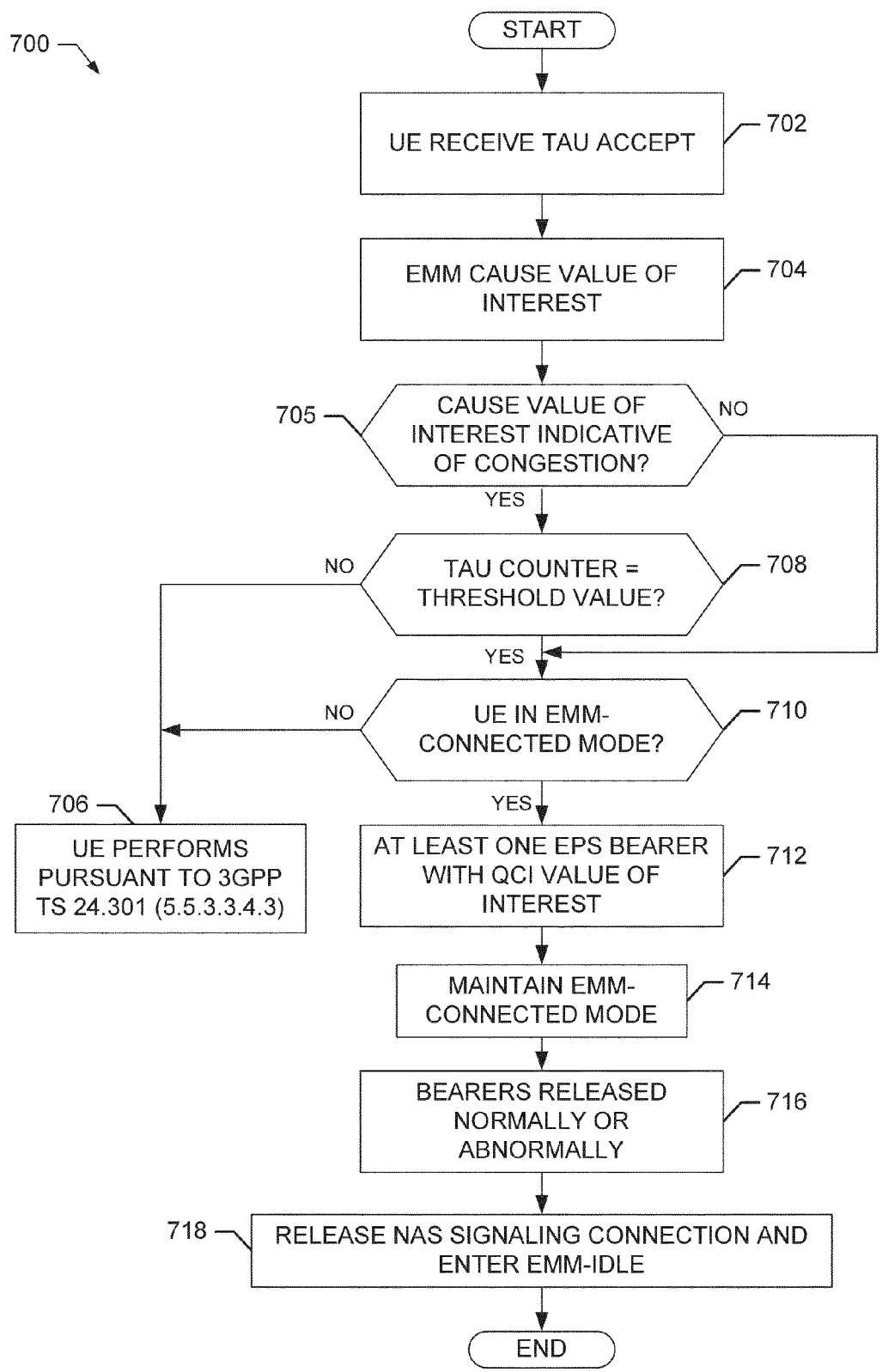

FIG. 7 depicts a flow diagram representative of an example process 700 that may be implemented using computer readable instructions in response to instances where a combined or periodic TAU procedure is successful for EPS services only, in a manner generally consistent with 3GPP TS 24.301 section 5.5.3.3.4.3. In the illustrated example of FIG. 7, the EMM state monitor 304 determines whether the UE 102 receives a TAU accept message (block 702) (e.g., TRACKING AREA UPDATE ACCEPT). If not, the EMM state monitor 304 continues to monitor for a TAU accept message and, when it is detected, the EMM state monitor 304 determines whether the network provides a cause value of interest (block 704). If no cause value of interest is detected (block 704), the UE 102 performs pursuant to 3GPP TS 24.301 section 5.5.3.3.4.3 (block 706). If the cause value of interest is indicative of congestion (e.g., cause value #22 pursuant to 3GPP TS 24.301 section 5.5.3.3.4.3) (block 705), then the mobile continuity manager 132 determines whether the number of times a TAU timer has expired is equal to a threshold value (block 708) (e.g., a value of 5). If not equal to the threshold value, then the UE 102 performs pursuant to 3GPP TS 24.301 section 5.5.3.3.4.3 (block 706). In some examples, the cause value of interest is indicative of CS domain not available (e.g., cause value #18 pursuant to 3GPP TS 24.301 section 5.5.3.3.4.3).

On the one hand, if the cause value of interest is indicative of congestion (block 705) and further the threshold value is met (block 708), then the EMM state monitor 304 determines whether the UE 102 is in EMM_CONNECTED mode (block 710). On the other hand, if the cause value of interest is not indicative of congestion (block 705), then the EMM state monitor 304 determines whether the UE 102 is in EMM_CONNECTED mode (block 710). If not, the UE 102 performs pursuant to 3GPP TS 24.301 section 5.5.3.3.4.3 (block 706), otherwise the EPS bearer monitor 302 determines if at least one bearer of interest (e.g., an EPS bearer with QCI value="1") exist (block 712). If so, then the UE 102 maintains the session and continues using at least the bearer of interest and the UE 102 maintains a state of EMM_CONNECTED mode (block 714) to permit any ongoing session to continue without interruption, and the UE 102 will refrain from releasing the session or any bearers until after determining that a normal or abnormal bearer release has occurred. If the EPS bearer monitor 302 determines that bearer(s) of interests still exist or no bearer(s) of interest have been released normally or abnormally (block 716), then the UE 102 stays in the state of EMM_CONNECTED mode (block 714), otherwise the NAS interface manager 312 releases all the bearers and releases the NAS signaling connection and causes the UE 102 to enter EMM_IDLE mode (block 718).

Figure 8:
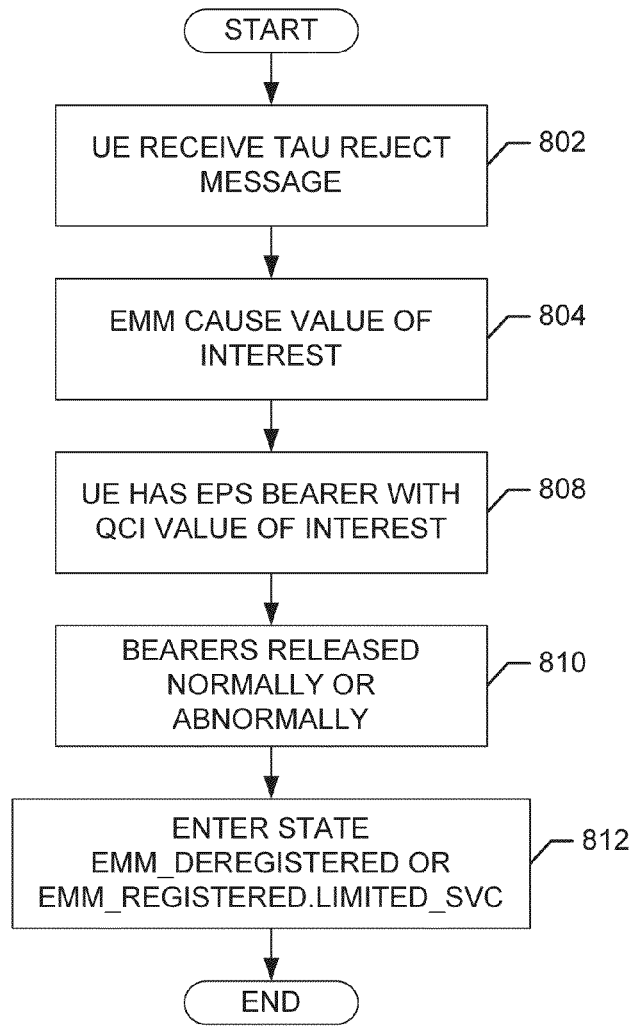

FIG. 8 depicts a flow diagram representative of an example process 800 that may be implemented using computer readable instructions in response to instances where a combined TAU procedure is not accepted by the network, in a manner generally consistent with 3GPP TS 24.301 section 5.5.3.3.5. In the illustrated example of FIG. 8, the EMM state monitor 304 determines whether the UE 102 receives a TAU reject message (block 802). If not, the EMM state monitor 304 continues to monitor for a TAU reject message and, when it is detected, the EMM state monitor 304 determines whether the network provides an EMM cause value of interest (block 804). If the network has not provided an EMM cause value of interest (block 804), the UE 102 performs generally pursuant to 3GPP TS 24.301 section 5.5.3.3.5 (block 806), otherwise the EPS bearer monitor 302 determines if a bearer of interest is detected or exists (block 808), for example, if the UE 102 has an EPS bearer with a Quality of Service control index (QCI) of "1." If so, then the EPS bearer monitor 302 determines whether at least the bearer of interest is maintained or is released normally or abnormally (block 810).

If at least the bearer of interest is not released abnormally or normally (block 810), the UE 102 maintains its current state and the UE 102 will refrain from releasing the session or any bearers until after determining that a normal or abnormal bearer release of at least the bearer of interest has occurred. However, when at least the bearer of interest is released normally (e.g., due to the end of a call) or abnormally (e.g., due to signal strength degradation), the UE 102 releases all the bearers and enters a state of EMM_DEREGISTERED or EMM_REGISTERED_LIMITED_SERVICE (block 812).

Figure 9:
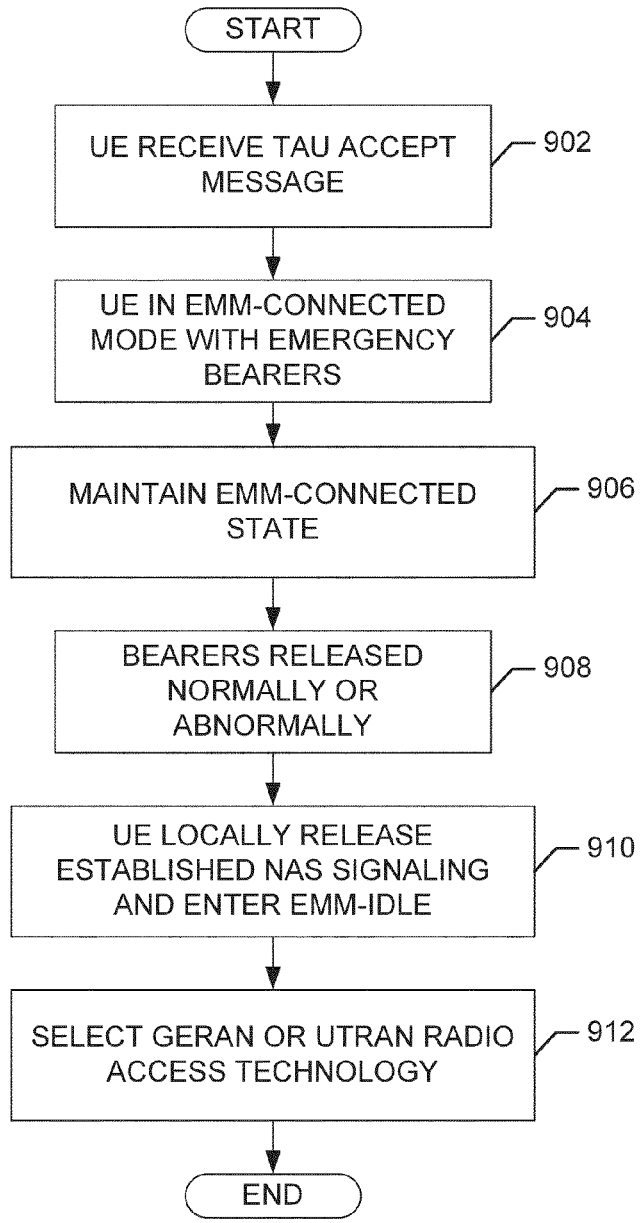
Figure 10:
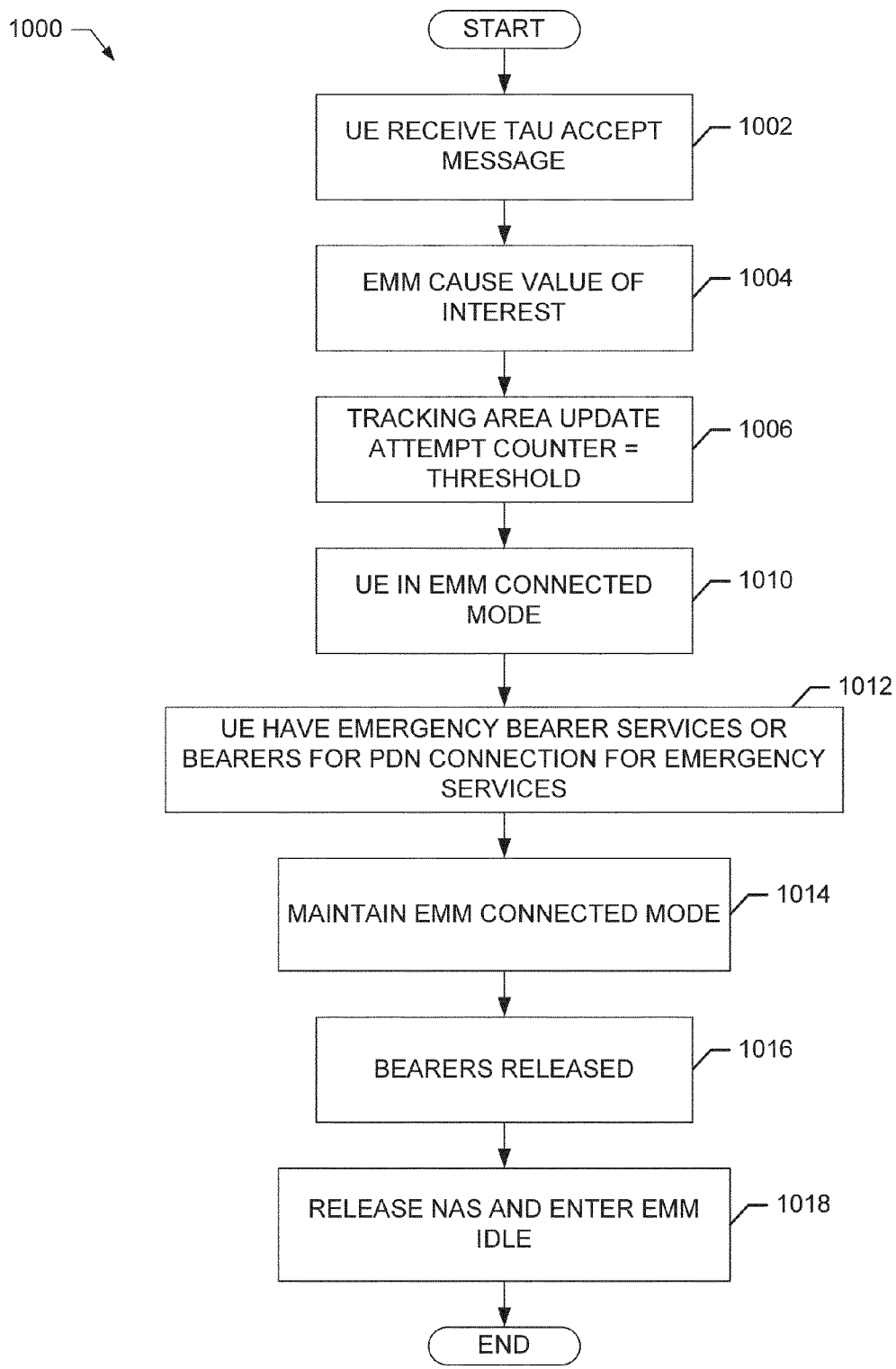

FIGS. 9 and 10 generally relate to processes to address circumstances where emergency bearers may be in use. However, the methods and apparatus described in view of FIGS. 4-8 may also apply in view of the use of bearers having a type associated with emergency services. Current standards (at the time of filing of the instant disclosure) require the UE in connected mode and in a CS/PS mode 1 in E-UTRAN to locally release established NAS signaling connections after detecting in a message from the network indicative of "IMS voice not available," or the UE in connected mode in processing messages from the network determines that the VSIs has changed. In the event such a message is detected or such a change of VSIs is determined during a call and/or a multimedia session, then current standards locally release the NAS signaling connection(s) and the session is dropped. Additionally, in the event that at least one of the bearers is of type emergency, then those will also be dropped, which may result in emergency calls being dropped unnecessarily. Accordingly, the example processes of FIGS. 9-12 maintain current emergency calls active and delay NAS actions until the bearers (emergency or not) are released in a normal or abnormal manner.

FIG. 9 depicts a flow diagram representative of an example process 900 that may be implemented using computer readable instructions in response to instances where a combined tracking area updating procedure is successful, in a manner generally consistent with 3GPP TS 24.301 section 5.5.3.3.4.2. In the illustrated example of FIG. 9, the EMM state monitor 304 determines whether the UE 102 receives a TAU accept message (block 902). If not, the EMM state monitor 304 continues to monitor for the TAU accept message and, when it is detected, the EMM state monitor 304 determines whether the UE 102 is in EMM_CONNECTED mode with emergency bearers (block 904). Additionally or alternatively, the EMM state monitor 304 may determine whether there are any bearer(s) associated to a PDN for emergency services (block 904). If so, then the EMM_CONNECTED mode is maintained to preserve a current call session (block 906) and the EPS bearer monitor 302 determines whether the EPS bearers are released in a normal or abnormal manner (block 908). If the bearers are not released in a normal or abnormal manner (block 908), then the UE 102 maintains its EMM_CONNECTED state (block 906), thereby keeping the emergency session ongoing.

On the other hand, when or if the bearers are released normally or abnormally (block 908), the NAS interface manager 312 causes the UE to locally release established NAS signaling and enter a state of EMM_IDLE (block 910). Upon completion of such release, a GERAN or UTRAN radio access technology is selected pursuant to 3GPP TS 24.301 section 5.5.3.3.4.2.

FIG. 10 depicts a flow diagram representative of an example process 1000 that may be implemented using computer readable instructions in response to instances where a combined, normal or periodic tracking area updating procedure is successful for EPS services, in a manner generally consistent with 3GPP TS 24.301 section 5.5.3.3.4.3. In the illustrated example of FIG. 10, the EMM state monitor 304 determines whether the UE 102 receives a TAU accept message (block 1002). If not, the EMM state monitor 304 continues to monitor for the TAU update message and, when it is detected, the EMM state monitor 304 determines whether the network provides an EMM cause value of interest (block 1004). If the network provides an EMM cause value of interest (block 1004), the mobile continuity manager 132 determines whether the number of times a TAU timer has expired is equal to a threshold value (block 1006) (e.g., a value of 5). If the EMM state monitor 304 determines no EMM cause value of interest (block 1004) or the number of times the TAU timer has expired is not equal to a threshold value (block 1006), then the UE 102 performs pursuant to 3GPP TS 24.301 section 5.5.3.3.4.3.

However, in the event that the TAU timer is equal to a threshold value (block 1006), then the EMM state monitor 304 determines whether the UE 102 is in EMM_CONNECTED mode (block 1010). If not, then the UE 102 performs pursuant to 3GPP TS 24.301 section 5.5.3.3.4.3. On the other hand, if the UE 102 is in EMM_CONNECTED mode (block 1010), then the EPS bearer monitor 302 determines if the UE is associated with any emergency bearers, emergency bearer services, or bearers for PDN connection for emergency services (block 1012). If so, then the UE 102 is maintained in the EMM_CONNECTED mode to preserve any existing session (block 1014). If the EPS bearer monitor 302 determines that no bearers have been released normally or abnormally (block 1016), then the UE 102 stays in the EMM_CONNECTED mode (block 1014). However, when the EPS bearer monitor 302 determines that one or more bearers have been normally or abnormally released (block 1016), then the NAS interface manager 312 releases the NAS signaling connection(s) and causes the UE 102 to enter a state of EMM_IDLE (block 1018).

Figure 11:
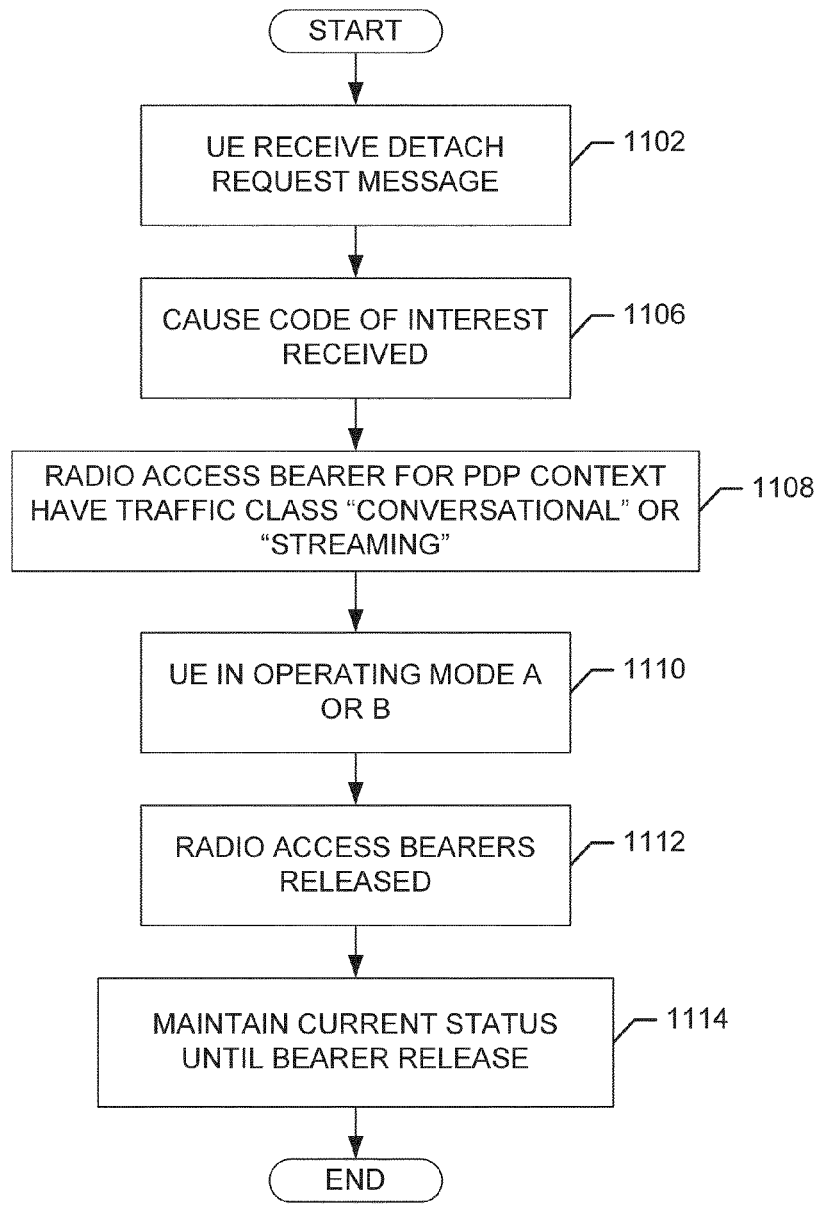
Figure 12:
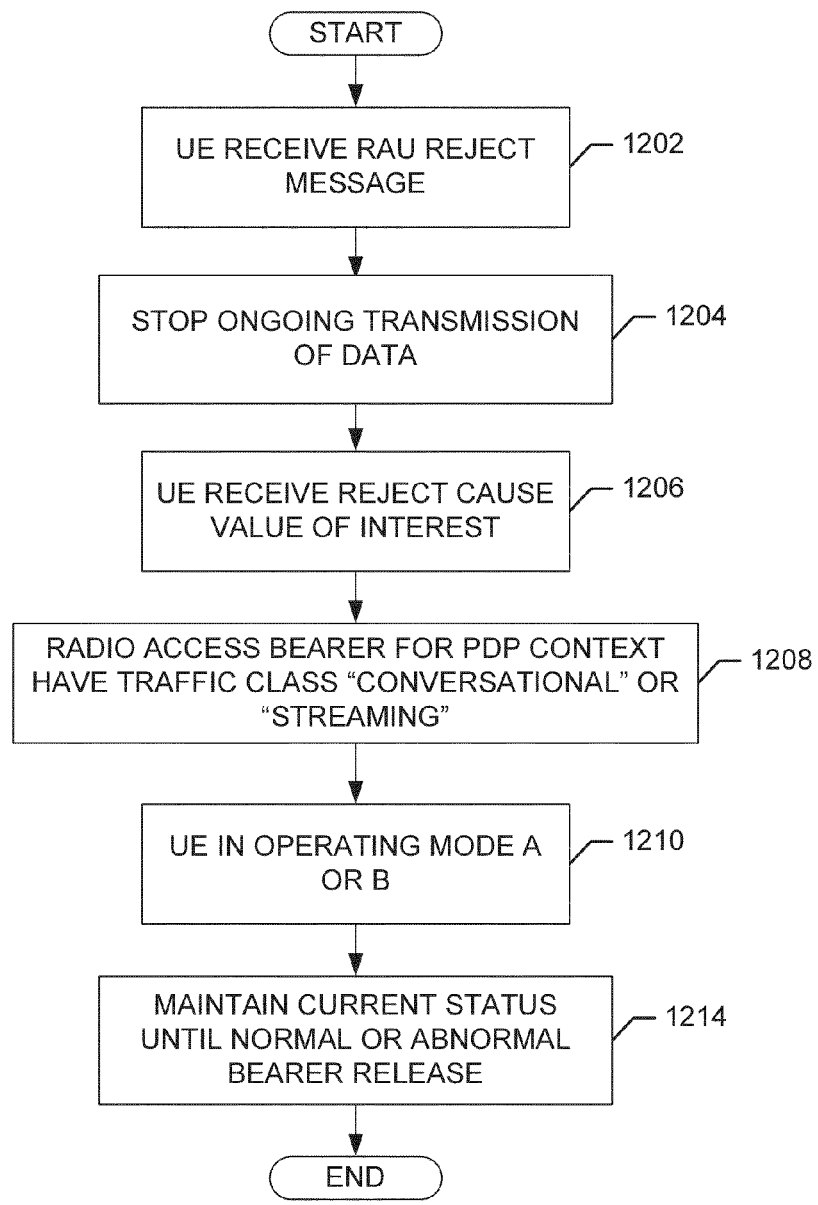

FIGS. 11 and 12 generally relate to processes to address circumstances where the UE 102 is in an ongoing voice or multi-media session using one or more GMM procedures. In the event that the network responds to a GMM procedure with particular cause values/codes (e.g., #12, #13, #14, #15, #25, etc.) in a manner consistent with 3GPP TS 24.008, the network may allow an existing UE session to complete or continue—by maintaining the required resources or bearers to continue that session—even if the network provides a negative permission response. While current standards cause the UE 102 to disconnect in such circumstances, even when the GPRS network is capable of maintaining or has kept necessary resource to allow maintain the session, the methods and apparatus described herein delay UE 102 disconnect actions until the radio access bearers are normally or abnormally released.

FIG. 11 depicts a flow diagram representative of an example process 1100 that may be implemented using computer readable instructions in response to instances of network initiated GPRS detach procedures completed by a mobile station (MS) (hereinafter referred to a UE, such as the example UE 102), in a manner generally consistent with 3GPP TS 24.008 section 4.7.4.2.2. In the illustrated example of FIG. 11, the GPRS attach manager 314 determines whether the UE 102 receives a detach request message (block 1102). If not, the GPRS attach manager 314 continues to monitor for the detach request message and, when it is detected and/or otherwise received, the GMM state monitor 314 determines if a cause code of interest is received by the network (block 1106). If so, then the traffic class monitor 308 determines whether the UE 102 has at least one radio access bearer (RAB) for PDP context that is indicative of a traffic class "conversational" or "streaming" (block 1108). If not, then the UE 102 performs in a manner generally pursuant to 3GPP TS 24.008 section 4.7.4.2.2. However, if the UE 102 has at least one radio access bearer RAB for PDP context that is indicative of a traffic class "conversational" or "streaming," then the GMM state monitor 314 determines whether the UE 102 is in operating mode A or B (block 1110).

If the UE 102 is in operating mode A or B (block 1110), then the UE 102 will maintain at least the RAB for PDP contexts that are indicative of a traffic class "conversational" or "streaming" and will refrain from releasing RABs for PDP context indicative of a traffic class "conversational" or "streaming" until after determining that a normal or abnormal bearer release of the RABs for PDP contexts that are indicative of a traffic class "conversational" or "streaming" has occurred. The GMM state monitor 314 then determines whether at least the RABs for PDP contexts that are indicative of a traffic class "conversational" or "streaming" are released (block 1112). If not, then the current status of the UE 102 is maintained to preserve the ongoing session (block 1114). On the other hand, when at least the RABs for PDP contexts that are indicative of a traffic class "conversational" or "streaming" are released (block 1112), then the UE 102 performs pursuant to 3GPP TS 24.008 section 4.7.4.2.2 (block 1116). Additionally, for any negative (i.e., "NO") decision of blocks 1104, 1106, 1108 and/or 1110, the UE 102 performs pursuant to 3GPP TS 24.008 section 4.7.4.2.2 (block 1116).

FIG. 12 depicts a flow diagram representative of an example process 1200 that may be implemented using computer readable instructions in response to instances where normal and periodic routing area updating procedures are not accepted by the network, in a manner generally consistent with 3GPP TS 24.008 section 4.7.5.1.4. In the illustrated example of FIG. 12, the GPRS attach manager 314 determines whether the UE 102 receives a RAU reject message (block 1202). If not, the GPRS attach manager 314 continues to monitor for the RAU reject message and, when it is detected and/or otherwise received, the mobile continuity manager 132 causes the UE 102 to stop ongoing transmission of data (block 1204) and determines if the UE has received a reject cause value of interest (block 1206). If so, then the traffic class monitor 308 determines whether the UE 102 has at least one radio access bearer (RAB) for PDP context that is indicative of a traffic class "conversational" or "streaming" (block 1208). If not, then the UE 102 performs in a manner generally pursuant to 3GPP TS 24.008 section 4.7.5.1.4. However, if at least one of the RABs for PDP context is indicative of a traffic class "conversational" or "streaming," then the GMM state monitor 314 determines whether the UE 102 is in operating mode A or B (block 1210).

If the UE 102 is in operating mode A or B (block 1210), then the UE 102 will maintain at least the RABs for PDP contexts that are indicative of a traffic class "conversational" or "streaming" and will refrain from releasing RABs for PDP context indicative of a traffic class "conversational" or "streaming" until after determining that a normal or abnormal bearer release has occurred. Then the GMM state monitor 314 determines whether at least the RABs for PDP contexts that are indicative of a traffic class "conversational" or "streaming" are released (block 1212). If not, then the current status of the UE 102 is maintained to preserve the functionality of the ongoing session (block 1214). On the other hand, when at least the RABs for PDP contexts that are indicative of a traffic class "conversational" or "streaming" are released (block 1212), then the UE 102 performs pursuant to 3GPP TS 24.008 section 4.7.5.1.4 (block 1216). Additionally, for any negative (i.e., "NO") decision of blocks 1204, 1206, 1208 and/or 1210, the UE 102 performs pursuant to 3GPP TS 24.008 section 4.7.5.1.4 (block 1216).

In some examples, the methods, apparatus and/or articles of manufacture disclosed herein teach how to maintain a bearer(s). The IMS supports a one or more services (e.g., a voice service, multimedia, etc.), and the IMS uses bearer(s) for transporting media, such as audio (e.g., voice, music, etc.). Additionally, the IMS may use a bearer(s) for sending and/or receiving SIP request(s) and/or responses. If bearers for transporting media (e.g., such as voice) are maintained, notwithstanding one of more VSIs with values indicative of the network in ability to support the media, further changes also enable procedures that allow changes to these bearers and allow changes to media using these bearers.

In other examples, a UE and/or a network component receives or sends a SIP request (e.g., involving creation of a new SIP dialog) for a session involving services for which the user anticipates high quality (e.g., voice service since CS voice services generally have a high quality) or receives or sends a SIP request (part of an existing SIP dialog) indicative of a modification of a session involving such CS-like services. Note that prior to sending a SIP request (part of an existing SIP dialog) indicative of a modification of a session, a network node may receive (and send) request for capabilities (part of an existing SIP dialog) in order to e.g. determine the capabilities prior to requesting to modify the session. If the session is ongoing, even if CS media indicators (e.g., one or more VSI values, indicators related to video, multimedia, etc.) indicate that no PS voice is allowed (e.g., an IMS_VoPS indicator is set to indicate that IMS PS Voice sessions/calls are not supported (e.g., set to "off")), then the request to modify an existing session involving CS-like services need not be rejected based on the IMS VoPS indicator value. Additionally, the SIP request within a dialog or SIP response within a dialog for the modification of the session should not be rejected based on the CS media indicators (e.g., VSI values), if the session modification involves a request to modify an existing session/bearer supporting CS-like services (e.g., "voice"). Similarly, a request for capabilities (part of an existing SIP dialog) requesting capabilities of an existing session/bearer supporting CS-like services (e.g., "voice") should not be prevented from indicating the media (e.g., voice) capabilities even though the media indicators (e.g., CS media indicators, VSIs, etc.) may indicate voice (and/or other media type(s)) is not supported. The methods and apparatus disclosed herein facilitate, in part, monitoring of contents of session description protocol (SDP) for information indicative of codecs suitable for CS-like services or voice (and/or other media) services. Additionally, the methods and apparatus described herein facilitate, in part, monitoring of service information (SI) or session information requesting authorization of a modification to an existing session/bearer supporting CS-like service (e.g., "voice"), where the authorization is subject to media indicator(s) (e.g., VSI). Without limitation, monitoring of service information may include receiving one or more messages that include one or more types of information to be monitored and/or CS media, which may include codecs suitable for voice.

In some examples, a UE and/or a network receives or sends a SIP request (e.g. involving creation a new SIP dialog) querying for a session involving services for which the user anticipates high quality (e.g., voice services, in which CS voice services typically have a relatively high quality) or receives or sends a SIP request (part of an existing SIP dialog) indicative of querying for capabilities for a session involving such CS-like services. An example of such a SIP request includes a SIP OPTIONS request. The SIP OPTIONS request may be sent within a dialog (e.g., an existing dialog) or outside a dialog/standalone. A response to these queries may be subject to CS media indicator(s) (e.g., VSI) and whether the query was received within or outside an existing dialog and whether the query pertains to a session involving a CS-like service.

Circuit switched networks enable change of voice codec. In packet switched networks if a codec is changed, it needs to be verified if the bearer transporting the media en/decoded by that codec is still suitable and, thus, whether the change of codec is allowable. While circuit switched networks may cause a change of a, for example, voice codec, if that codec is not propagated between UEs between the CS and PS networks, then transcoding and/or voice service quality degradation may occur. In circumstances where an ongoing session requires a new codec, the methods and apparatus disclosed herein may be used to reduce the number of transcoding steps involved with UEs capable of using IMS using SIP dialog/sessions and communicating with network(s) that police SIP requests for dialogs, SIP requests within dialogs and/or SIP responses, where the policing can be e.g. based on CS media indicator(s) (e.g., VSI). Voice calls involving UEs may include one or more voice transcoding steps in legacy GSM and/or UMTS networks. The transcoding is performed to, in part, transport the voice call and it employs radio network compression techniques through a core network (e.g. the standard G.711 pulse code modulated (PCM) codec over 64 kbit/sec circuit switched links). To call fixed phone lines, transcoding a voice data stream via the G.711 PCM codec is necessary.

If both ends of a session are in the UMTS network, for example, then transcoder free operations work well. However, when one of the two parties to the voice session is handed over to a GSM network (e.g., due to roaming), for example, transcoding must occur unless one or more codecs can be changed and/or re-negotiated that are suitable for voice. Existing (current as of the filing of the instant disclosure) standards do not accommodate codec negotiation or querying for session capabilities subject to CS media indicator(s) (e.g., VSI).

Figure 13:
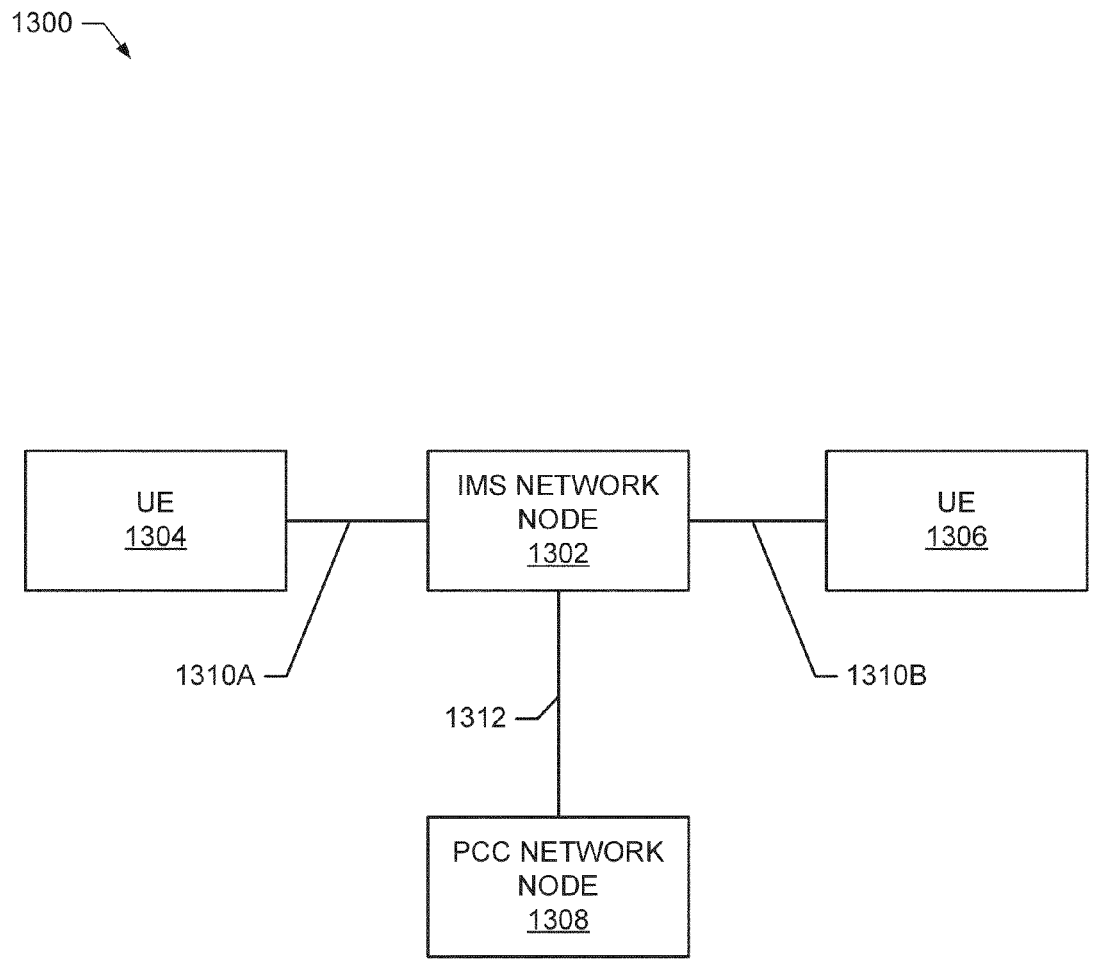
FIGS. 13 and 14 depict example architectures of a policy and charging control (PCC) subsystem.

FIG. 13 depicts an illustration showing a policy and charging control (PCC) network node environment 1300. A policy and charging control (PCC) network node environment 1300 can police SIP requests and SIP responses, but also other requests involving reservation of IP resources used by another application layer than provided by IMS (e.g. HTTP streaming). In the illustrated example of FIG. 13, an IMS network node 1302 is communicatively connected to a first UE 1304 and a second UE 1306. Additionally, the IMS network node 1302 is communicatively connected to a PCC network node 1308. SIP requests and SIP responses 1310A and 1310B may occur within a dialog, outside a dialog between UEs and IMS network node(s). Requests for authorizing session information and corresponding responses 1312 may be transmitted between IMS network node(s) 1302 and PCC network node(s) 1308. In some examples, the requests for authorizing session information and corresponding responses are transmitted as part of an application function (AF) session. As used herein, an AF session includes an application level session established or queried by an application level signaling protocol offered by an AF (e.g., an element offering application(s) that use IP bearer resource(s)) that requires a session set-up or query with explicit session description before the use of the service.

Creating an AF session may involve opening an Rx DIAMETER session with the PCRF. Responses may include, but are not limited to responses indicative of a rejection. A rejection response received by an IMS network node 1302 that are sent by the PCC network node 1308 may cause a rejection response to be sent by the IMS network node 1302 to the UEs 1304, 1306. The rejection response sent by the PCC network node and received by the IMS network node may, for example, be communicated as part of the Diameter protocol or as part of the Radius protocol. The rejection response to be sent by the IMS network is typically part of the SIP protocol. Service information, including codec data with audio information including voice capable codecs, may be transmitted as part of the AF session to the PCRF. The PCRF may accept or reject the session information. The PCRF may determine PCC/QoS rules associated with the service information, and the PCC/QoS rules may be associated with an IP-CAN bearer. The methods and apparatus disclosed herein may detect whether the service information is associated with and/or otherwise pertains to an existing IP flow. In some examples, if the SI pertains to an existing IP flow, it is further determined whether the existing IP flow includes CS media. In the event that the IP flow includes CS media, a response to the request may be determined in a manner that is independent of one or more CS media indicator(s). Responses to the request may include, but are not limited to creating, modifying or deleting PCC rule(s) related to the SI.

In some examples, if the AF provides service information that has been fully negotiated (e.g., based on an SDP answer), the AF may include the Service-Info-Status AVP set to FINAL-SERVICE-INFORMATION. In such cases, the PCRF authorizes the session and provisions the corresponding PCC/QoS rules to the PCEF/BBERF. The AF may additionally provide preliminary service information not fully negotiated yet (e.g., based on the SDP offer) at an earlier stage. To do so, the AF includes the Service-Info-Status AVP with the value set to PRELIMINARY SERVICE INFORMATION. If the AF queries for capabilities for an AF session, the AF includes the Service-Info-Status AVP set to PRELIMINARY SERVICE INFORMATION. Upon receipt of such preliminary service information, the PCRF performs an early authorization check of the service information. For GPRS and EPC, the PCRF may not provision PCC rules towards the PCEF unsolicitedly. However, the PCRF may authorize a PCC/QoS rule request received from the PCEF/BBERF.

For IMS-based services, the network may monitor SDP to determine if a session description is allowable, and/or if a service can be supported, and/or determine whether the service exceeds a QoS budget. The network may also monitor if a session description is allowed based on VSI values. In an Internet protocol connectivity access network (IP-CAN) that supports IMS, one or more functional elements may be identified including, but not limited to proxy call session control function (P-CSCF), serving CSCF (S-CSCF), application server (AS), service centralization and continuity (SCC) ASs, etc. These functional elements may internetwork with a policy and charging control (PCC) subsystem. A PCRF, such as the PCRF 128 of FIG. 1 may receive service information derived from the SDP from an application function (AF) (e.g., logically encompassed within a P-CSCF in the IM CN Subsystem) and determine whether or not to authorize requested service information based on, for example, VSI values.

Figure 14:
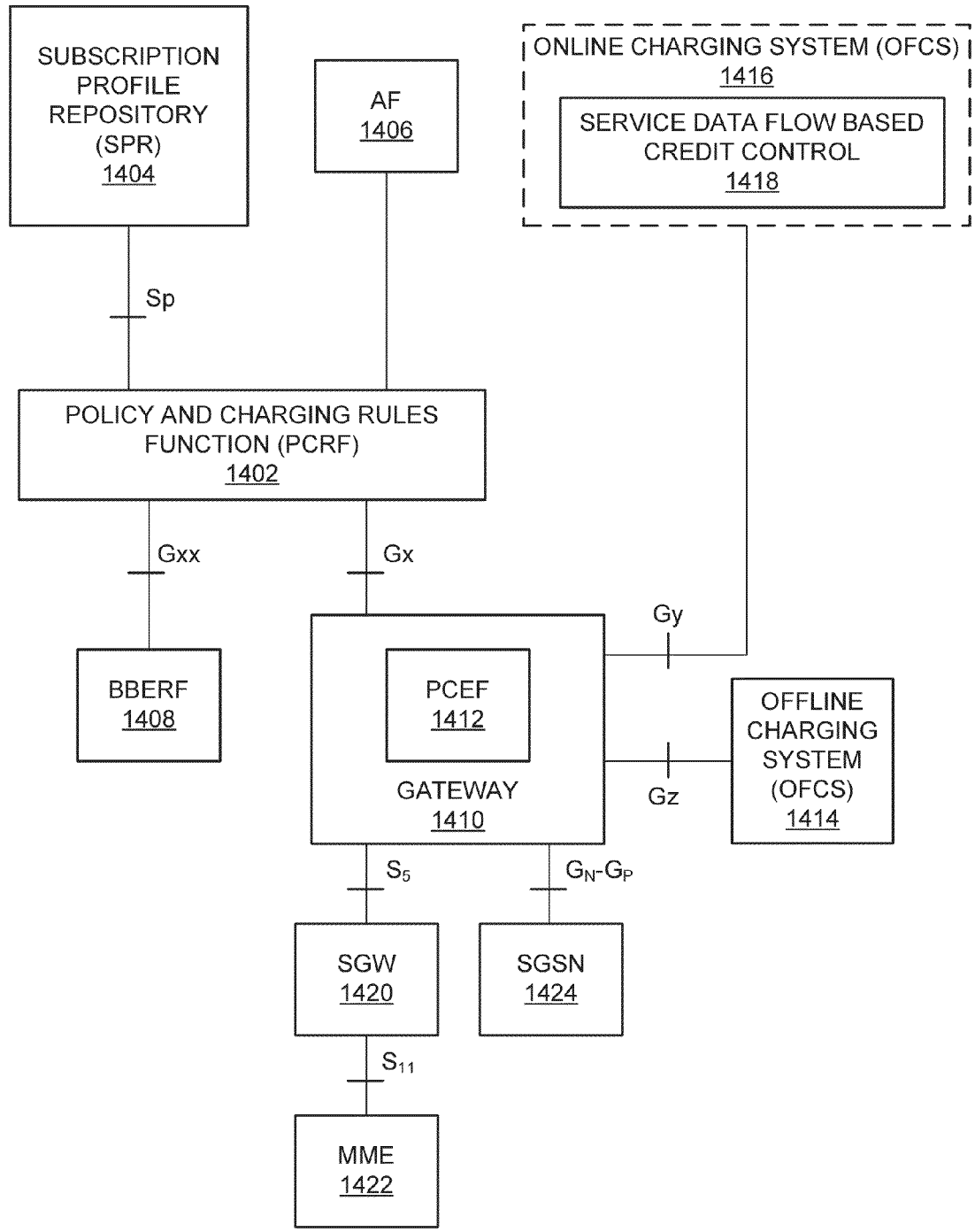

FIG. 14 depicts an illustration showing an overall PCC logical architecture in a non-roaming configuration. PCRF 1402 is in communication with a Subscription Profile Repository (SPR) 1404, an AF 1406, a Bearer Binding and Event Reporting Function (BBERF) 1408 and a gateway 1410 (including a Policy and Charging Enforcement Function (PCEF) 1412). The PCRF 1402 receives IP CAN session modification messages and IP CAN session creation messages, some of these messages including at least one VSI. The gateway 1410 can be a P-GW or a GGSN. The gateway 1410 is in communication with both an Online Charging System (OCS) 1416 and an Offline Charging System (OFCS) 1414. The OCS 1416 provides a Service Data Flow Based Credit Control 1418. The gateway 1410 is further in communication with a signaling gateway function (S-GW) 1420 and a mobility management entity (MME) 1422, and an SGSN 1424. This communication involves exchanging messages, the messages may include at least one VSI. In the illustrated example of FIG. 14, $G_N$-$G_P$ messages may be triggered by context activation, PDP context modification and RAU. Additionally, $S_{11}$ and $S_5$ messages may be triggered by attach and TAU. In the example PCC architecture of FIG. 14, the AF 1406 provides services to one or more UEs (e.g., the AF 1406 may be an IMS server).

SIP dialogs are created, for example, with a response to an initial request (e.g., SIP INVITE request). An example of such a response is a 2xx response, such as SIP 200 OK response. In operation, the network, such as the EPC 124, may employ the PCRF 128, 1402 to perform media authorization for handling session modifications or to perform media authorization for handling session creation following a SIP INVITE request. In particular, in the event that the session description (e.g., embodied within SDP payload of a SIP message) is modified (e.g., due to session modification(s)), then the value of the VSI is not used to dictate whether requested service information (e.g., derived from the SDP payload) is authorized. The service information also comprises codec-data, the codec-data containing codec related information known at the AF (e.g., derived from the SDP payload). The service information can include audio media such as, for example, codecs suitable for voice. The network may receive SIP requests, SIP responses and/or SIP messages querying the capabilities of the network (e.g., SIP OPTIONS requests and their corresponding responses). While the network does not reserve bearers in accordance with PCC rules and/or QoS rules associated with the service information, the network may determine an authorization check of service information. Depending on the SIP request, SIP response and/or SIP message, the network may involve the VSI performing the authorization of the service information.

Figure 15:
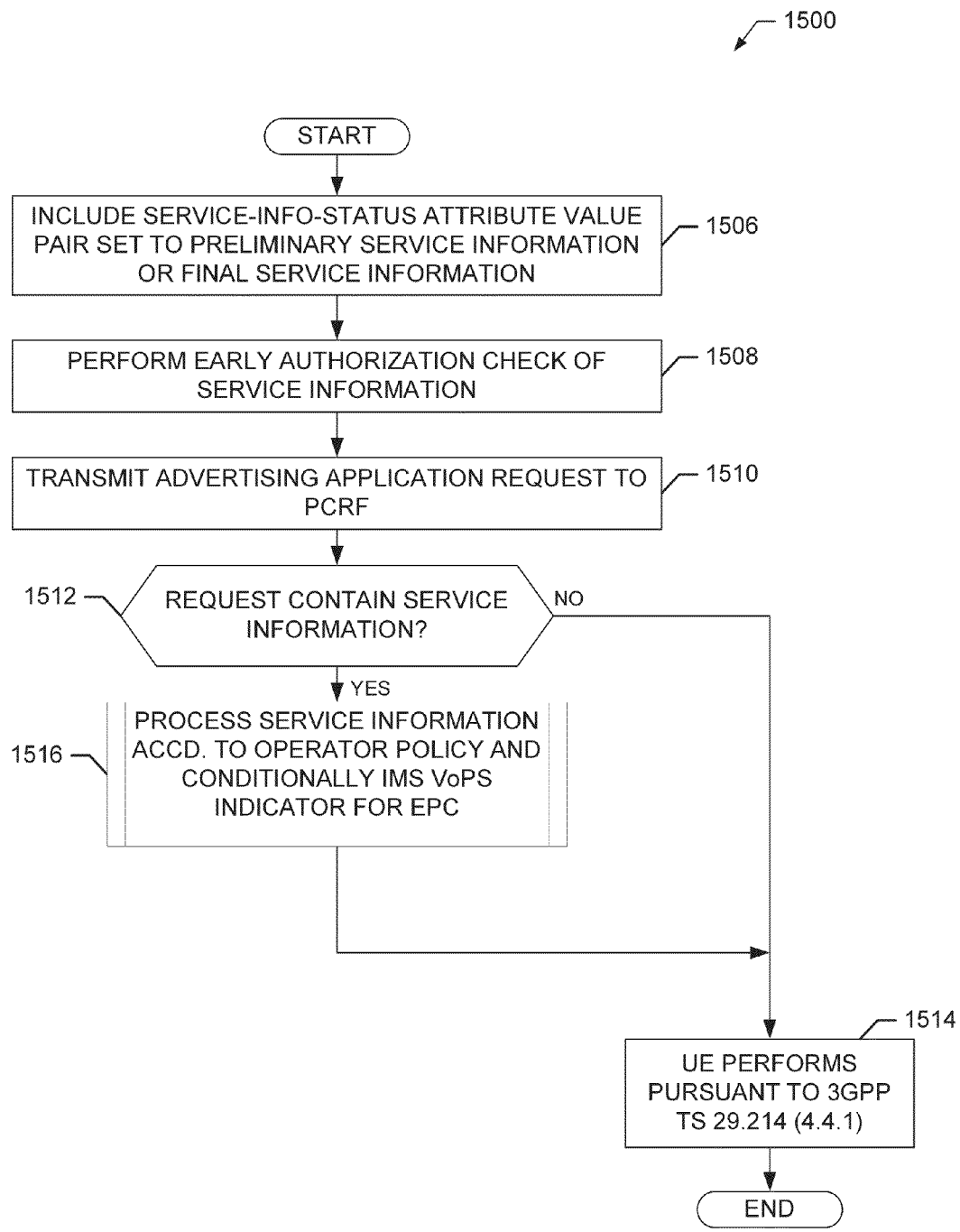
FIGS. 15 and 16 depict flowcharts of example processes for updating service information during an ongoing session.

FIG. 15 depicts a flow diagram representative of an example process 1500 that may be implemented using computer readable instructions in response to a query for capabilities (e.g. using SIP OPTIONS request), in a manner generally consistent with 3GPP TS 29.214 section 4.4.1. The SIP method OPTIONS or the SIP OPTINS request allows a User Agent (UA) to query another UA or a proxy server as to its capabilities, which may allow a client or UA to discover information about the supported methods, content types, extensions, codecs, etc. without e.g. "ringing" the other party. In the illustrated example of FIG. 15, the network component including an AF 130, 1406 (e.g., a P-CSCF) of FIG. 1 or FIG. 14 determines whether capabilities are queried (e.g. a SIP OPTIONS request is received). As described above, an AF is an element offering application(s) that use IP bearer resources, and an AF session is an application level session established or queried by an application level signaling protocol offered by the AF that requires a session set-up or query with explicit session description before the use of the service. If no capabilities for an AF session are queried, the P-CSCF 130, 1406 continues to monitor for one or more SIP requests and/or SIP responses. On the other hand, in response to receipt and/or detection of a query of capabilities, the P-CSCF 130, 1406 may open an Rx diameter session with the PCRF 128, 1402, and the P-CSCF or AF may send a message to the PCRF. Additionally, the P-CSCF 130, 1406 includes an attribute value pair (AVP) indicating that upon receipt the PCRF performs authorization procedures for the query for capabilities, but the PCRF does not provision the corresponding PCC/QoS rules to the PCEF/BBERF. Additionally, the P-CSCF includes an indication (this indication may also be referred to as the "within an existing session/dialog" indication) that the query for capabilities was received within an existing dialog or the query for capabilities was received as a standalone request (outside an existing dialog). The AVP included may be included in the service information status. Additionally, the indication included may be included in the service information status. The AVP included may be set to PRELIMINARY_SERVICE_INFORMATION (block 1506). The aforementioned AVP setting allows, in part, a query to occur without causing resources to be consumed when creating bearers.

The PCRF 128, 1402 performs an early authorization check of service information (block 1508) if the PCRF receives an advertising application (AA) request from the PCRF 128, 1402 (block 1510). If the request contains service information (block 1512), the PCRF 128, 1402 may process the service information according to operation policy and taking into account VSI for service information pertaining to voice services (e.g., the IMSVoPS indicator (block 1516). In the event that the service information provided in the AA request is rejected, the PCRF may indicate an AA-Answer having a cause for the rejection, such as an AVP set to a value REQUESTED_SERVICE_NOT_AUTHORIZED. If the request is rejected due to an IMSVoPS indicator, the PCRF may include the IMSVoPS AVP set to IMSVOPS_NOT_SUPPORTED.

Figure 16:
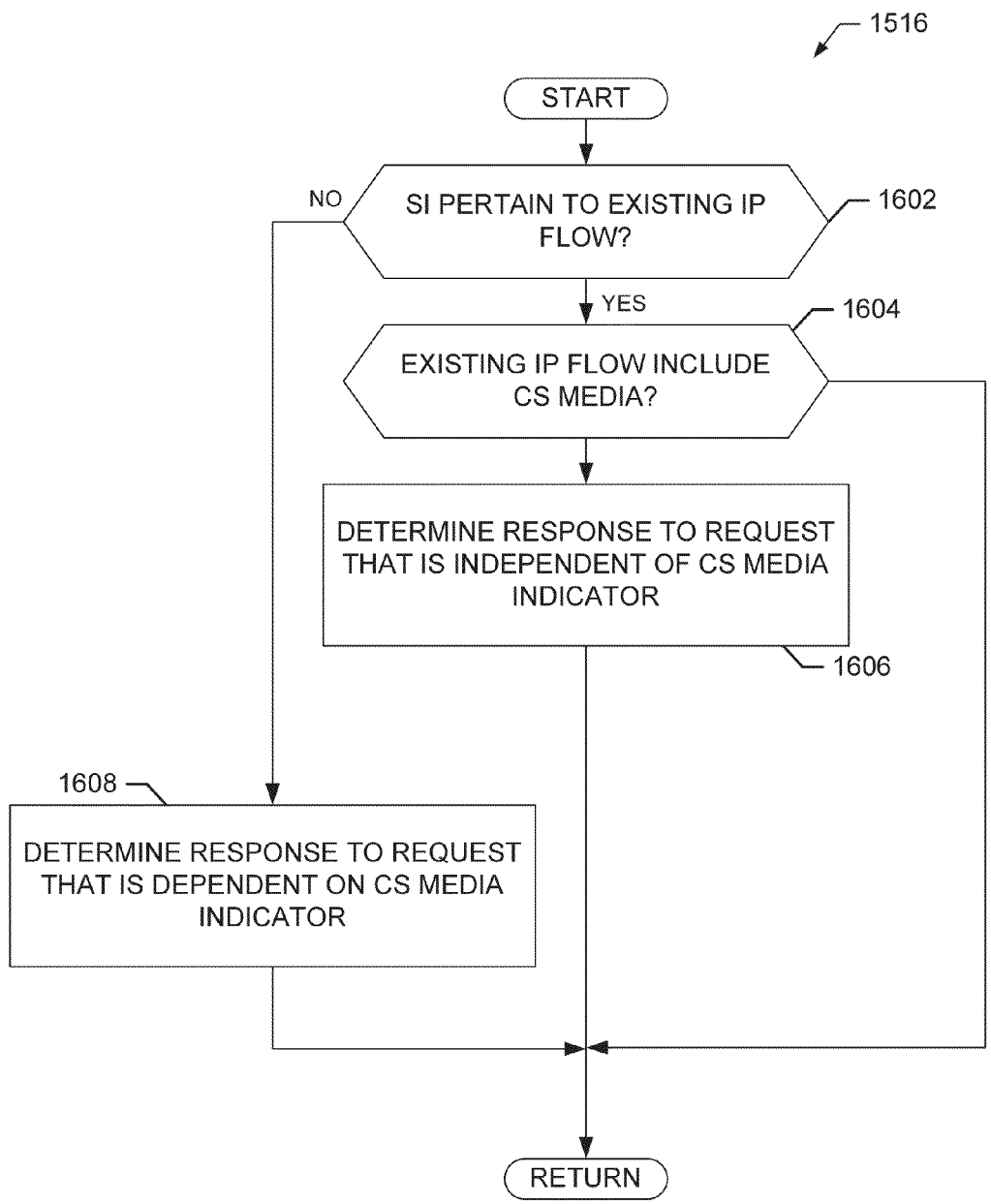

FIG. 16 depicts a flow diagram representative of further detail of the example process of block 1516. In the illustrated example of FIG. 16, the PCRF 128, 1402 determines and/or otherwise detects whether the service information pertains to an existing IP flow (block 1602) and, if so, determines whether the existing IP flow includes CS media (block 1604). The SI may include an AVP set as, for example, PRELIMINARY SERVICE INFORMATION or FINAL SERVICE INFORMATION. Additionally, the SI may correspond with PCC or QoS rules and/or changes thereof. In the event that the existing IP flow includes CS media (block 1604), such as voice, video, speech codecs suitable for voice, etc., the example PCRF 128, 1402 determines a response to the request that is independent of a CS media indicator (block 1606), which may include, but is not limited to VSI. Responses may also include, but are not limited to, creating, modifying or deleting PCC rules that are related to the SI, as described above.

In the event that the SI does not pertain to an existing IP flow (block 1602), the example PCRF 128, 1402 determines a response to the request(s) that is dependent on one or more CS indicator(s) (block 1608). In circumstances where an existing IP flow does not include CS media (block 1604), the example UE performs in a manner pursuant to 3GPP TS 29.214 (block 1514).

If the PCRF 128, 1402 processes the service information and taking into account VSI for service information pertaining to voice services, the PCRF may come to a different authorization depending on the indication that the query for capabilities was received within an existing dialog or the query for capabilities was received as a standalone request (outside an existing dialog). If the indication indicates that the service information derived from the query for capabilities was received within an existing dialog, the service information authorization request may be authorized, independent of a VSI value. If the indication indicates that the service information derived from the query for capabilities was received in a stand-alone request, then the service information authorization request may be rejected due to a VSI value.

If the bearer subject to PCC/QoS rules pertaining to a voice services has already been created and the service information derived from the query for capabilities pertains to the created bearer, the VSI may not be consulted when performing the authorization procedures or when determining the response message contents to the AA request. On the application layer or IMS layer, such a scenario would resemble the P-CSCF receiving a SIP OPTIONS query for alternative voice capabilities (e.g. voice codecs) within a dialog for an existing voice stream or voice capable bearer.

In a further example, if the indication indicates that the service information derived from the query for capabilities was received within an existing dialog and the PCEF/BBERF have been provisioned with corresponding PCC/QoS rules, then the service information authorization request may be authorized, independent of a VSI value.

In a further example, if the indication indicates that the service information derived from the query for capabilities was received within an existing dialog and the service information pertains to a voice service and PCC/QoS rules pertaining to a voice services have been provisioned, then the service information authorization request may be authorized, independent of a VSI value.

If the PCRF rejects the service information due to VSI value(s), the PCRF may include an indicator in the AA-Answer. The indicator may indicate the rejection reason. The indicator may be one or more VSI values. The AF/P-CSCF receiving the indicator may, if the indicator indicates that IMS voice over PS session is not supported, send a SIP message (e.g., a SIP request or a SIP response) indicating PS voice is not supported. In one example, indicating PS voice is not supported considers not including, in the SDP payload of a SIP message, "m" lines set to "audio" and containing codecs suitable for voice or set the <port> in such "m" lines to zero. In one further example, indicating PS voice is not supported considers not excluding, in the SDP payload of a SIP message, "m" (media) lines set to "audio" and containing a PSTN indication, as well as "c" (connection) lines containing a PSTN indication. In yet another example, indicating PS voice is not supported includes indicating that no CS-like service is supported in the SIP message. Indicating that no CS-like service is supported may involve including or not including particular feature tags, video codecs known to be supported on the CS domain, etc.

The IMSVoPS indicator/flag and value may be part of the AA-Answer sent in response to receiving the AA request or in any other message sent to the AF/P-CSCF. A corresponding IMSVoPS AVP may be of a type Enumerated and indicates support of voice over IMS. If the AF IMSVoPS AVP is not provided in the AA-Response, and if the IP-CAN is, for example, GPRS, then the value IMSVoPS_NOT_SUPPORTED (e.g., IMSVOPS_NOT_SUPPORTED(1)) is assumed to be true. However, if the IP-CAN is not, for example, GPRS, then the value IMSVoPS_SUPPORTED (e.g., IMSVOPS_SUPPORTED(0)) is assumed to be true. The AF or P-CSCF or PCRF can make assumptions pertaining to VSI values depending on the IP-CAN if a value for the particular VSI is not present in the AA-Answer.

If the request is rejected due to the IMSVoPS indicator, then the IMSVoPS AVP is set to indicate that IMS PS voice sessions are not supported, e.g. by indicating IMSVOPS_NOT_SUPPORTED.

While requests for capabilities may occur within a dialog or stand-alone, requests for capabilities do not cause existing Service Information to be updated with the new information received (e.g. including provisioning the PCEF/BBERF with corresponding PCC/QoS rules) in the AA request. On the other hand, requests for updating service information may cause existing Service Information to be updated with the new information received in the AA request. Examples of SIP messages that may cause a request for updating service information are SIP UPDATE requests received by the P-CSCF/AF and SIP re-INVTE requests received by the P-CSCF or any of their responses received by the P-CSCF.

Accordingly, the PCRF may include in the AA request upon preparing a request for updating service information, an attribute value pair (AVP) indicating that upon receipt the PCRF performs authorization procedures for the query for capabilities, but the PCRF does not yet provision the corresponding PCC/QoS rules to the PCEF/BBERF. Alternatively, if the request to update service information is final, the PCRF may include in the AA request upon preparing a request for updating service information, an attribute value pair (AVP) indicating that upon receipt the PCRF performs authorization procedures for the query for capabilities, and the PCRF provisions the corresponding PCC/QoS rules to the PCEF/BBERF or updates the service information, if the request is authorized. In both cases, the P-CSCF includes an indication that the request for updating service information was received within an existing dialog. If the query or the request for updating service information was received as a standalone request (outside an existing dialog) it may cause creation of a new bearer (e.g. suitable for voice).

Similar procedures as for processing a request for capabilities apply in the P-CSCF, AF and PCRF when processing a request for updating service information. However, a request for updating service information is caused by a SIP message received within a dialog. Additionally, unlike a request for capabilities, a request for updating service information can cause service information to be updated, if authorized. Similarly, a request for updating service information may be authorized without consulting a VSI value, if the service information to be updated pertains to an existing voice session or voice bearer or voice stream. On the other hand, a request to create a service information pertaining to a new voice session/bearer/stream may be authorized by consulting a VSI value.

TABLE 1

| P-CSCF receives SIP request or SIP response part of a query for capabilities | PCRF receives AA request corresponding to query for capabilities |
|---|---|
| Within dialog? | Consult VSI if queried service information does not pertain to existing voice service information |
| Stand-alone? | Consult VSI |

TABLE 2

| P-CSCF receives SIP request or SIP response part of a service information update | PCRF receives AA request corresponding to service information update |
|---|---|
| Within dialog and not final? | Consult VSI if queried service information does not pertain to existing voice service information |
| Within dialog and final? | Consult VSI if queried service information does not pertain to existing voice service information and update service information is authorized |

TABLE 3

P-CSCF receives AA response from PCRF rejecting the AA request's service information due to VSI
P-CSCF creates a SDP payload excluding "m" lines with voice codecs, where the "m" line further excludes a "PSTN" indication. Is a SIP request was received, P-CSCF creates and responds with a SIP 488 (Not acceptable) response including the created SDP payload or excluding any SDP payload In an alternative example, as opposed to including an indication that the AA request's service information was rejected due to VSI in a rejection message, the PCRF includes the acceptable service information in the rejection message. The PCRF may allow some media, in particular, the PCRF may allow media with voice codecs for a connection using the CS domain (i.e. media with voice codecs indicating PSTN). The PCRF may not allow media with voice codecs for a connection using the PS domain. Upon receipt of such a rejection message, the P-CSCF translates the allowable media in to "m" lines and other lines suitable for SPD payload and inclusion in SIP messages.

In some examples, procedures at the P-CSCF 130, 1406 may include receiving a SIP request containing an SDP offer with the media line(s) ("m" lines) set to audio and containing codecs suitable for voice. The media lines may not modify any existing audio stream (e.g., where an existing stream can be detected by comparing the <media>, <port>, <proto> in the media field), and the IMSVoPS information may be available. Accordingly, the P-CSCF 130, 1406 may return a 488 response (Not Acceptable Here) containing the SDP payload. In the event that the IMSVoPS information indicates that IMS voice over PS session is not supported, then the P-CSCF 130, 1406 may not indicate in the SDP that the media lines set to audio and containing codecs suitable for voice using PS connections are usable. The P-CSCF 130, 1406 may include SDP with the media lines set to audio and containing codecs suitable for voice using CS domain or PSTN connections (i.e. related to a "c" line set to "PSTN").

Although certain methods, apparatus, and articles of manufacture have been described herein, the scope of coverage of this disclosure is not limited thereto. To the contrary, this disclosure covers all methods, apparatus, and articles of manufacture fairly falling within the scope of the appended claims either literally or under the doctrine of equivalents. Additionally, the scope of coverage of the present disclosure is not limited to 3GPP systems, but may relate to other wireless and/or non-wireless systems including, but not limited to Institute of Electrical and Electronics Engineers systems and CDMA systems.

What is claimed is:

1. A user equipment (UE) configured to:
   initiate a tracking area updating (TAU) procedure in an evolved packet system (EPS) mobility management (EMM) connected (EMM_CONNECTED) mode;
   identify a lack of a voice service in response to the TAU procedure being successful;
   identify a bearer context; and
   stay in the EMM_CONNECTED mode until a radio bearer associated with the bearer context are released.

2. A UE as defined in claim 1, further configured to locally release an established non-access stratum signaling connection in response to the release of the bearer context.

3. A UE as defined in claim 1, wherein the bearer context comprises an evolved packet system bearer context.

4. A UE as defined in claim 1, wherein the bearer context comprises a target quality of service control index of 1.

5. A method comprising:
   initiating, at a user equipment (UE), a tracking area updating (TAU) procedure in an evolved packet system (EPS) mobility management (EMM) connected (EMM_CONNECTED) mode;
   receiving a TAU ACCEPT message;
   identifying a lack of a voice service in response to receiving the TAU ACCEPT message;
   identifying a bearer context; and
   refraining from releasing the bearer context until a radio bearer associated with the bearer context is released.

6. A method as defined in claim 5, further comprising the UE locally releasing an established non-access stratum signaling connection in response to the release of the radio bearer.

7. A method as defined in claim 6, further comprising entering an evolved packet system mobility management (EMM) IDLE mode before selecting one of (a) a global system for mobile communication (GSM) radio access network (GERAN) radio access technology or (b) a universal terrestrial radio access network (UTRAN) radio access technology.

8. A method as defined in claim 5, wherein the bearer context is a bearer context of interest.

9. A method as defined in claim 8, wherein the bearer context of interest is an EPS bearer context.

10. A method as defined in claim 8, wherein the bearer context of interest comprises a target quality of service control index value of 1.

11. A method as defined in claim 5, wherein the UE is in circuit switched/packet switched (CS/PS) mode 1.

12. A method as defined in claim 5, wherein the TAU ACCEPT message comprises an evolved packet system mobility management (EMM) cause value.

13. A method as defined in claim 12, wherein the EMM cause value comprises one of #22 and #18.

14. A method as defined in claim 5, wherein a tracking area updating timer is equal to 5.

15. A method as defined in claim 5, wherein the bearer context comprises an emergency bearer context.

16. A method as defined in claim 5, wherein identifying the lack of a voice service is indicative of Internet Protocol multimedia subsystem (IMS) voice not available.

17. A user equipment (UE), configured to:
initiate a tracking area updating (TAU) procedure in an evolved packet system (EPS) mobility management (EMM) connected (EMM_CONNECTED) mode;
receive a TAU ACCEPT message;
identify a lack of a voice service in response to receiving the TAU ACCEPT message;
identify a bearer context; and
refrain from releasing the bearer context until a radio bearer associated with the bearer context is released.

18. A UE as defined in claim 17, further configured to locally release an established non-access stratum signaling connection in response to the release of the radio bearer.

19. A UE as defined in claim 18, further configured to enter an EMM-IDLE mode before selecting one of (a) a global system for mobile communication (GSM) radio access network (GERAN) radio access technology or (b) a universal terrestrial radio access network (UTRAN) radio access technology.

20. A UE as defined in claim 17, wherein the bearer context is a bearer context of interest.

21. A UE as defined in claim 20, wherein the bearer context of interest is an evolved packet system bearer context.

22. A UE as defined in claim 20, wherein the bearer context of interest comprises a target quality of service control index value of 1.

23. A UE as defined in claim 17, wherein the UE is in circuit switched/packet switched (CS/PS) mode 1.

24. A UE as defined in claim 17, wherein the TAU ACCEPT message comprises an EMM cause value.

25. A UE as defined in claim 24, wherein the EMM cause value comprises one of #22 and #18.

26. A UE as defined in claim 17, wherein a tracking area updating timer is equal to 5.

27. A UE as defined in claim 17, wherein the bearer context comprises an emergency bearer context.

28. A UE as defined in claim 17, further configured to identify the lack of a voice service is indicative of Internet Protocol multimedia subsystem (IMS) voice is not available.

* * * * *